US011510423B2

(12) United States Patent
Callejon et al.

(10) Patent No.: US 11,510,423 B2
(45) Date of Patent: Nov. 29, 2022

(54) USE OF FAT COMPOSITIONS FOR SUSTAINING AN ENHANCED PALATABILITY OF PET FOOD OVER TIME

(71) Applicant: SPECIALITES PET FOOD, Elven (FR)

(72) Inventors: Laurence Callejon, Ploermel (FR);
Anne Levesque, La Vraie Croix (FR);
Cécile Niceron, Bayonne (FR);
Bernard Le Breton, Bohal (FR)

(73) Assignee: SPECIALITES PET FOOD, Elven (FR)

( * ) Notice: Subject to any disclaimer, the term of this patent is extended or adjusted under 35 U.S.C. 154(b) by 369 days.

(21) Appl. No.: 16/208,181

(22) Filed: Dec. 3, 2018

(65) Prior Publication Data
US 2019/0174796 A1 Jun. 13, 2019

Related U.S. Application Data

(63) Continuation of application No. 14/427,809, filed as application No. PCT/EP2013/068998 on Sep. 13, 2013, now abandoned.
(Continued)

(30) Foreign Application Priority Data

Sep. 13, 2012 (EP) .................................. 12306103

(51) Int. Cl.
*A23K 20/158* (2016.01)
*A23K 50/40* (2016.01)
(Continued)

(52) U.S. Cl.
CPC ............ *A23K 20/158* (2016.05); *A23K 10/20* (2016.05); *A23K 20/10* (2016.05); *A23K 40/20* (2016.05);
(Continued)

(58) Field of Classification Search
CPC ...... A23K 20/158; A23K 10/20; A23K 20/10; A23K 40/20; A23K 40/30; A23K 50/00; A23K 50/40; A23K 50/42
See application file for complete search history.

(56) References Cited

U.S. PATENT DOCUMENTS 4,296,132 A 10/1981 Lazarus et al.
4,713,250 A 12/1987 Tonyes et al.
(Continued)

FOREIGN PATENT DOCUMENTS

EP 2 636 307 A1 9/2013
GB 1 426 257 2/1976
(Continued)

OTHER PUBLICATIONS

Belitz et al., "Chapter 10 Milk and Dairy Products", pp. 514, XP002711327, "Food Chemistry", 2009, Berlin.
(Continued)

*Primary Examiner* — W A Moore
(74) *Attorney, Agent, or Firm* — Birch, Stewart, Kolasch & Birch, LLP

(57) ABSTRACT

The present invention concerns the use of a fat composition for sustaining an enhanced palatability of a food for pet over time, wherein said fat composition has a C12:0/C10:0 fatty acid weight ratio from about 0.85 to about 2.5 and/or a C14:0/C12:0 fatty acid weight ratio from about 0.45 to about 4.3. The present invention further concerns the use of said fat composition for preparing other enhanced palatability-sustaining fat compositions as well as foods for pet, all compositions and foods having an enhanced palatability sustained over time.

3 Claims, 3 Drawing Sheets

Related U.S. Application Data

(60) Provisional application No. 61/700,689, filed on Sep. 13, 2012.

(51) Int. Cl.

| | | |
|---|---|---|
| *A23K 40/20* | (2016.01) | |
| *A23K 40/30* | (2016.01) | |
| *A23K 10/20* | (2016.01) | |
| *A23K 20/10* | (2016.01) | |
| *A23K 50/00* | (2016.01) | |
| *A23K 50/42* | (2016.01) | |

(52) U.S. Cl.
CPC .............. *A23K 40/30* (2016.05); *A23K 50/00* (2016.05); *A23K 50/40* (2016.05); *A23K 50/42* (2016.05); *A23V 2002/00* (2013.01); *A23V 2200/00* (2013.01); *A23V 2200/08* (2013.01); *A23V 2200/14* (2013.01); *A23V 2200/15* (2013.01); *A23V 2200/16* (2013.01); *A23V 2250/18* (2013.01); *A23V 2250/186* (2013.01)

(56) References Cited

U.S. PATENT DOCUMENTS

| | | |
|---|---|---|
| 4,804,549 A | 2/1989 | Howley et al. |
| 6,270,820 B1 | 8/2001 | Fritz-Jung et al. |
| 7,951,493 B2 | 5/2011 | Lin et al. |
| 2003/0152664 A1 | 8/2003 | Couzy et al. |
| 2003/0176500 A1 | 9/2003 | Molly et al. |
| 2006/0257455 A1 | 11/2006 | Chen et al. |
| 2008/0248154 A1 | 10/2008 | Wiens |
| 2008/0274242 A1 | 11/2008 | Gutzmann et al. |
| 2009/0105195 A1 | 4/2009 | O'Brien |
| 2010/0021563 A1 | 1/2010 | Levesque et al. |
| 2010/0233756 A1* | 9/2010 | Sunvold .................. A23K 20/20 435/34 |
| 2010/0273881 A1* | 10/2010 | Bar Yosef .............. A23K 50/40 514/560 |
| 2010/0317734 A1 | 12/2010 | Folan et al. |
| 2012/0093973 A1 | 4/2012 | Parthasarathy |
| 2012/0237641 A1 | 9/2012 | Jia et al. |
| 2013/0295227 A1* | 11/2013 | Ter Haar ................. A23K 50/40 426/61 |
| 2015/0025145 A1 | 1/2015 | Hollander et al. |

FOREIGN PATENT DOCUMENTS

| | | |
|---|---|---|
| JP | 2008-054537 A | 3/2008 |
| WO | WO 9000016 A1 | 1/1990 |

OTHER PUBLICATIONS

International Search Report issued in PCT/EP2013/068998 dated Nov. 26, 2013.
"Chapter 10 Milk and Dairy Products" In: Hans-Dieter Belitz, Peter Schieberli W. Grosch: "Food Chemistry", 2009, Springer-Verlag Berlin Heidelberg Berlin, pp. 498-515.
"Palatability—More than a Matter of Taste", downloaded from http://extension.usu.edu/files/publications/factsheet/1_3_1.pdf, dated Mar. 1, 2003, 3 pages.
"Properties of Coconut Oils", p. 2, downloaded from https://www.organicfacts.net/...benefits/oils/propertiesofcoconutoil.html, Sep. 2003, 5 pages.
Yeomans, Proc. Nutr. Soc. (1998), vol. 57, pp. 609-615.

* cited by examiner ically-balanced diet, but also supplements, treats, and toys. Pets, like humans, are attracted to and eat more regularly and easily foods which they find palatable. Therefore, palatability enhancers are extremely important for animal consumption. Animal foods such as pet foods typically contain flavour compositions to increase the palatability thereof, and to make them appealing to pets.

USE OF FAT COMPOSITIONS FOR SUSTAINING AN ENHANCED PALATABILITY OF PET FOOD OVER TIME

CROSS REFERENCE TO RELATED APPLICATIONS

This application is a Continuation of application Ser. No. 14/427,809, filed on Mar. 12, 2015, which was filed as a National Phase of PCT International Application No. PCT/EP2013/068998 on Sep. 13, 2013, which claims priority under 35 U.S.C. § 119(e) to U.S. Provisional Application No. 61/700,689, filed on Sep. 13, 2012, and under 35 U.S.C. § 119(a) to patent application Ser. No. 12/306,103.8, filed in Europe on Sep. 13, 2012, all of which are hereby expressly incorporated by reference into the present application.

The present invention relates to the field of pet food.

More specifically, the present invention concerns the use of a fat composition for sustaining an enhanced palatability of a food for pet over time, wherein said fat composition has a C12:0/C10:0 fatty acid weight ratio from about 0.85 to about 2.5 and/or a C14:0/C12:0 fatty acid weight ratio from about 0.45 to about 4.3.

The present invention further concerns the use of said fat composition for preparing other enhanced palatability-sustaining fat compositions as well as foods for pet, all compositions and foods having an enhanced palatability sustained over time.

BACKGROUND OF THE INVENTION

Pets are well taken care of by their owners which provide them a proper selection of foods. Those foods include not only pets' usual nutritionally-balanced diet, but also supplements, treats, and toys. Pets, like humans, are attracted to and eat more regularly and easily foods which they find palatable. Therefore, palatability enhancers are extremely important for animal consumption. Animal foods such as pet foods typically contain flavour compositions to increase the palatability thereof, and to make them appealing to pets.

Among the high number of palatability enhancers that have been described so far, many show a limited industrial and commercial interest, at least because: (i) food palatability differs from one type of food to another in such a way that a palatability enhancer effective in dry pet foods can be not effective when used in semi-moist or wet pet foods; (ii) food palatability differs from one animal species to another so that a palatability enhancer effective with cats can be not effective with dogs; and (iii) the ability of palatability enhancers to confer palatability to food may be time-sensitive so that palatability enhancers' efficiency may be negatively impacted by storage over time.

Foods for pet are generally expected to have a rather long shelf life. For instance, the shelf life of dry pet foods is typically from about 12 to about 18 months. There is thus an interest to be able to ensure palatability of the foods for pet at least until their best-before date.

There is therefore a continuing need for new palatability enhancers which have a palatability-enhancing effect that is sustained over time, which provide a robust flavour and which are easily and effectively usable for companion animals including pets such as dogs and cats, in types of foods as different as dry, intermediate and wet foods.

The present invention precisely addresses this need by providing new compositions having an enhanced palatability-sustaining effect over time.

DEFINITIONS

Figure 1:
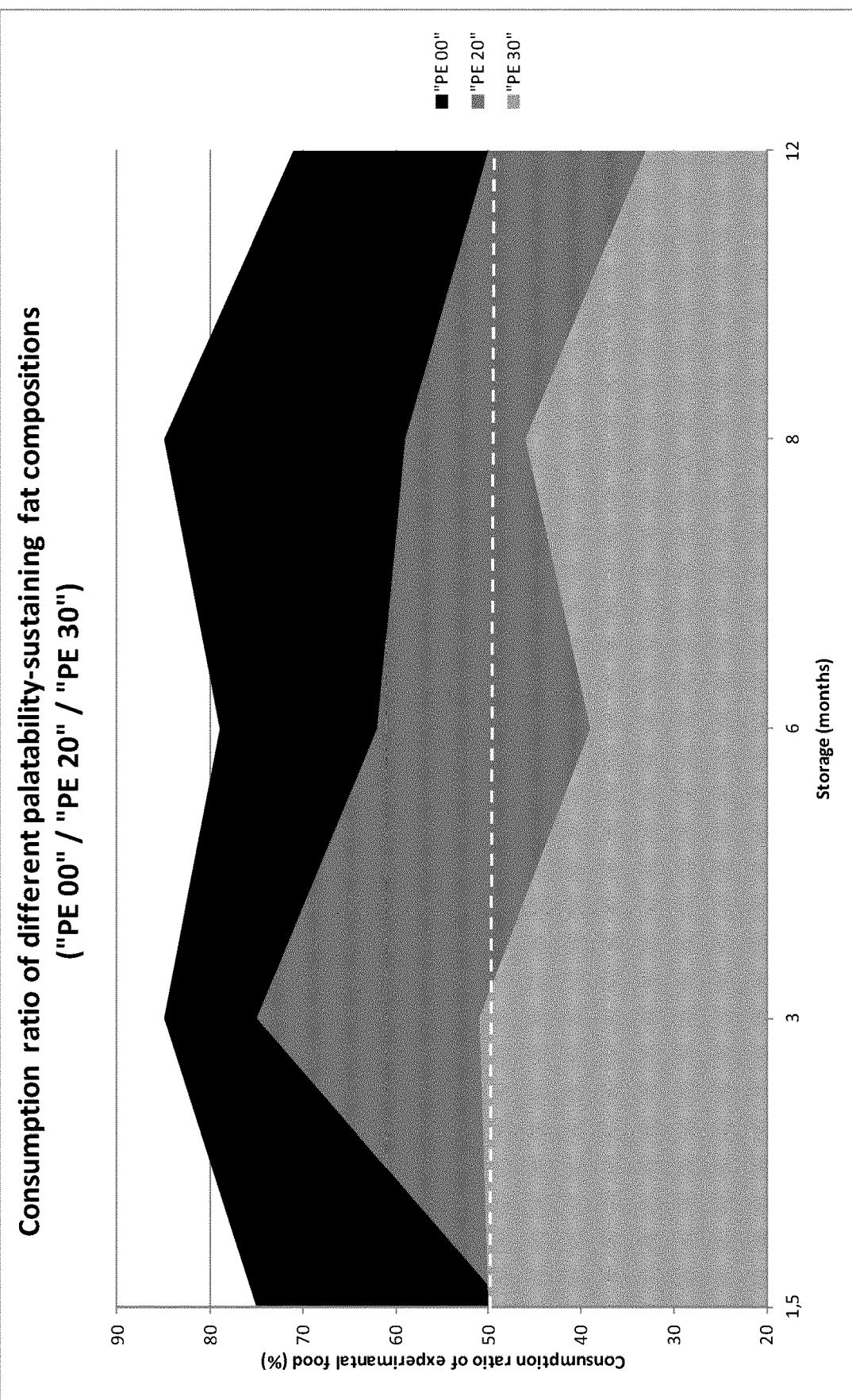
FIG. 1: Graph 1 illustrates comparative results obtained with stored "PE 00"/"PE 20"/"PE 30" in examples 4/9/11.
Figure 2:
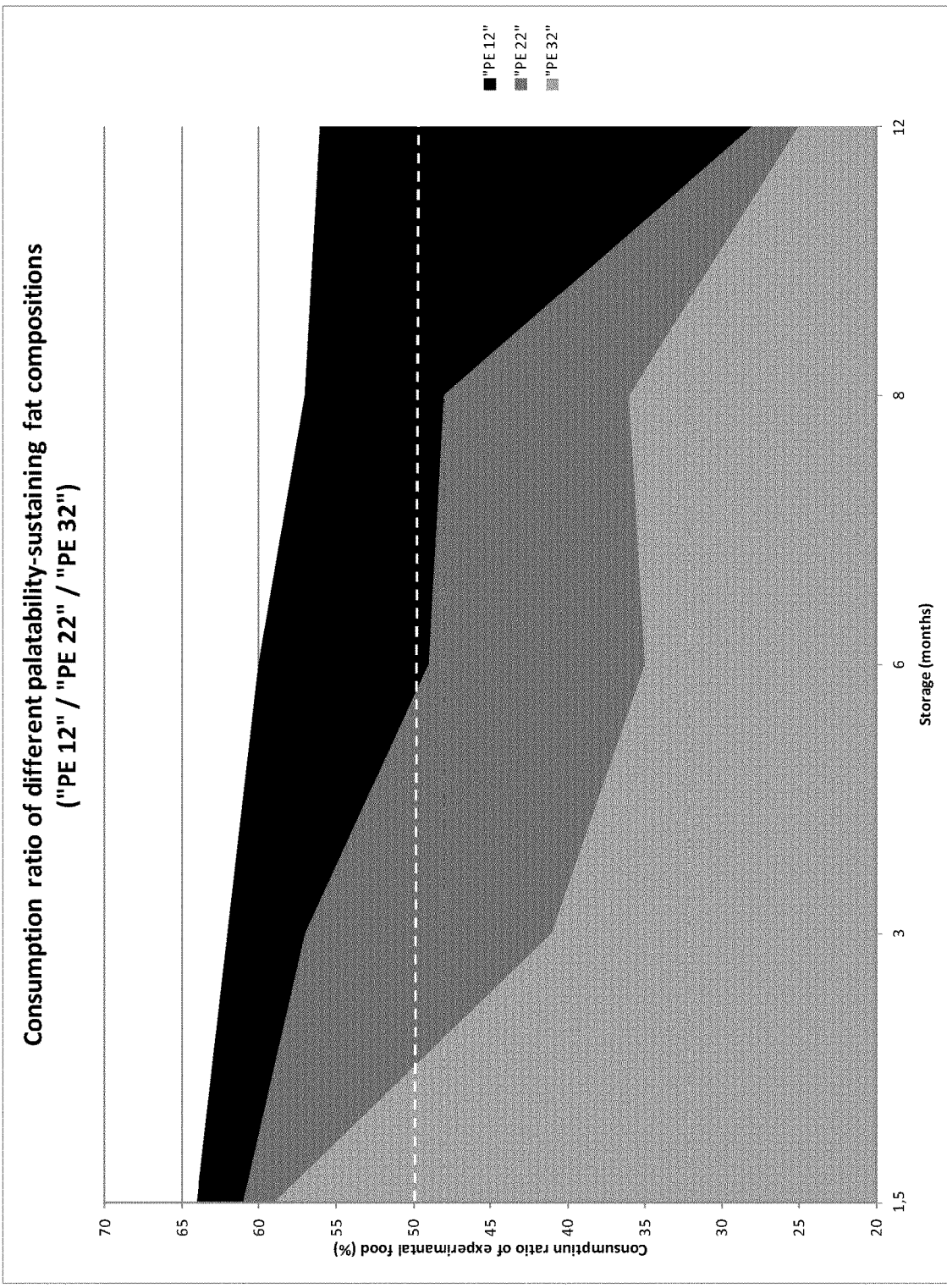
FIG. 2: Graph 2 illustrates comparative results obtained with stored "PE 12"/"PE 22"/"PE 32" in examples 5/10/12.
Figure 3:
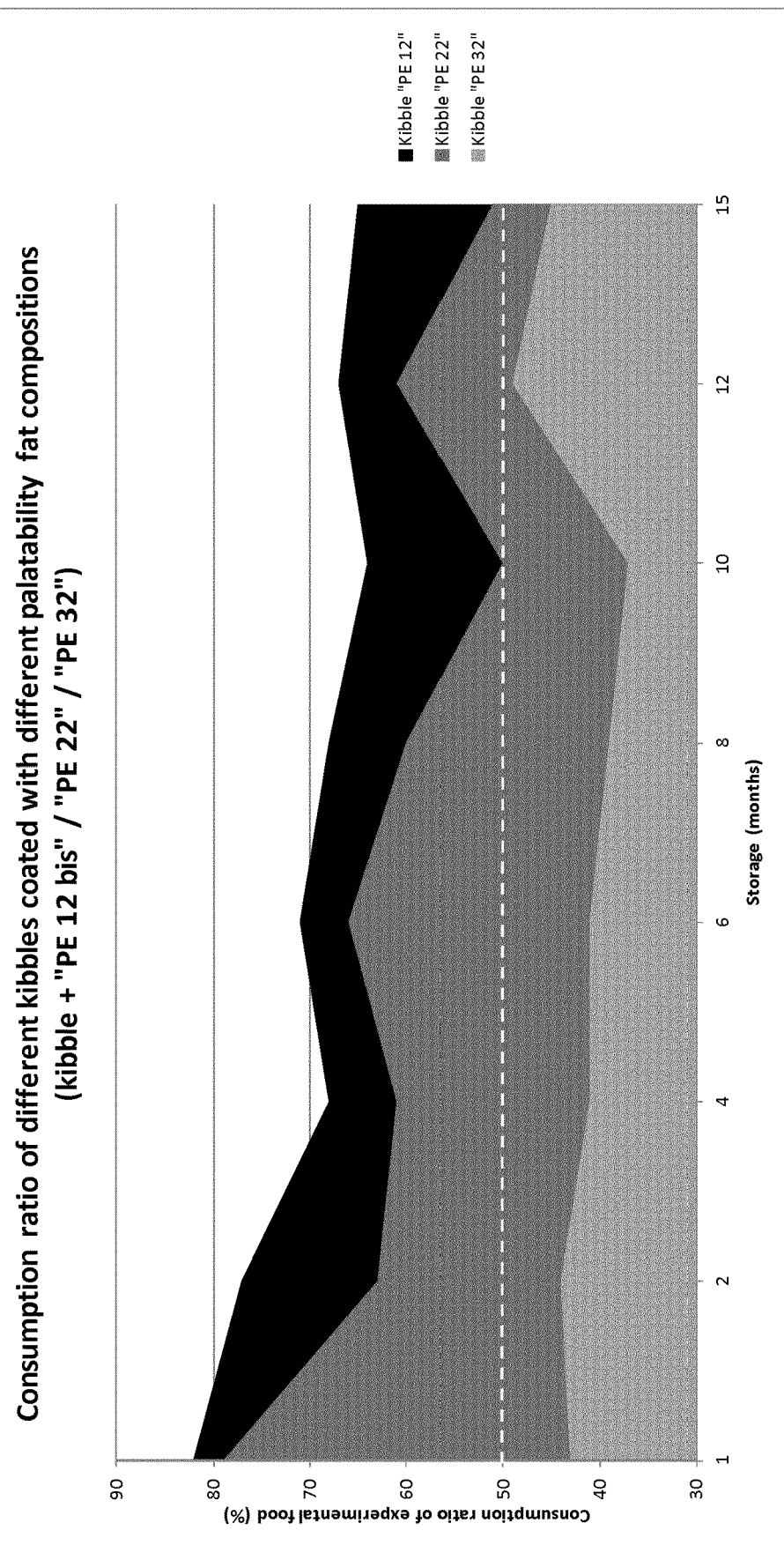
FIG. 3: Graph 3 illustrates comparative results obtained with stored kibbles coated with "PE 12bis"/"PE 22"/"PE 32" in examples 6/7/8.

Unless specifically stated otherwise, percentages are expressed herein by weight of a product reference (in particular, a fat composition). The person skilled in the art will appreciate that the term "dry matter basis" means that an ingredient's concentration or percentage in a composition is measured after the free water has been removed, or determined on the basis of the weight of the composition once the weight of any free moisture in the composition has been subtracted.

In the present disclosure, ranges are stated in shorthand, so as to avoid having to set out at length and describe each and every value within the range. Any appropriate value within the range can be selected, where appropriate, as the upper value, lower value, or the terminus of the range. For example, a range of 0.1-1.0 represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc.

As used throughout, the singular form of a word includes the plural, and vice versa, unless the context clearly dictates otherwise. Thus, the references "a", "an", and "the" are generally inclusive of the plurals of the respective terms. For example, reference to "a method" or "a food" includes a plurality of such "methods" or "foods". Similarly, the words "comprise", "comprises", and "comprising" are to be interpreted inclusively. Likewise the terms "include", "including" and "or" should all be construed to be inclusive. All these terms however have to be considered as encompassing exclusive embodiments that may also be referred to using words such as "consist of".

The methods and compositions and other embodiments exemplified here are not limited to the particular methodologies, protocols, and reagents that are described herein because, as the skilled artisan will appreciate, they may vary.

Unless defined otherwise, all technical and scientific terms, terms of art, and acronyms used herein have the meanings commonly understood by the skilled artisan in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

The term "about" as used herein when referring to a measurable value such as an amount, a temporal duration, and the like, is meant to encompass variations of ±15%, more preferably ±10%, even more preferably ±5%, from the specified value, as such variations are appropriate to reproduce the disclosed methods and products, in particular due to practical measure variations.

As used herein, the terms "fat", "oil", and "lipid" are synonymous and encompass also mixtures of fats or oils. Animal fats as well as vegetable oils and/or marine oils can be used. Any commercially-available source of animal, vegetable, marine fat can be tested. Plant oils are typically canola oil, soybean oil, corn oil, olive oil, sunflower oil, linseed oil, peanut oil, palm oil, palm kernel oil, safflower oil, rapeseed oil, cottonseed oil, coconut oil, and the like. Typical animal fats are beef fat (including beef tallow), pork fat (including pork lard), poultry fat (including chicken fat, turkey fat, duck fat, and combinations thereof), and the like. Marine oils are typically tuna oil, sardine oil, salmon oil, menhaden oil, anchovy oil, fish oil, and the like. Also are encompassed herein fats that are derived from animal, plant, marine sources, or that are produced by animals and plants. As used herein the term "fat" encompassed fats that have been processed (e.g. refined . . . ).

As used herein, the term "fat composition" means any composition which comprise at least a lipid, in particular at least one fatty acid.

From a structural point of view, fats are known to contain large quantities of triglycerides. "Triglycerides" are formed when three fatty acid molecules react with glycerol so that covalent ester bonds are formed between the glycerol molecule and the fatty acids.

Most fatty acids that are common in nature tend to have between 10 and 20 carbons. They can comprise one or more unsaturated bonds between adjacent carbon atoms. Examples of fatty acids include capric acid (10 carbons, C10:0), lauric acid (12 carbons, C12:0), myristic acid (14 carbons, C14:0), palmitic acid (16 carbons, C16:0), and stearic acid (18 carbons, C18:0), (all of which are saturated), as well as oleic, linoleic, and linolenic acids (C18 with 1, 2, and 3 unsaturated bonds, respectively), arachidic and arachidonic acid (20 carbons with 0 and 4 unsaturated bonds, respectively).

The term "palatability" means a relative preference of an animal for one food composition to another. Palatability refers to the overall willingness of an animal to eat a certain food. Advantageously but not necessarily, palatability further refers to the capacity of the eaten food to satisfy the animal. Whenever an animal shows a preference, for example, for one of two or more foods, the preferred food is more "palatable", and has "enhanced palatability". The relative palatability of one food compared to one or more other foods can be determined, for example, in side-by-side, free-choice comparisons, e.g., by relative consumption of the foods, or other appropriate measures of preference indicative of palatability. It can advantageously be determined by a standard testing protocol in which the animal has equal access to both compositions such as a test called "two-bowl test" or "versus test" (see below). Such preference can arise from any of the animal's senses, but typically is related to, inter alia, taste, aroma, flavour, texture, smell and/or mouth feel.

A pet food stated herein to have "enhanced palatability" is one for which a pet exhibits preference relative to a control composition. Advantageously, a pet food having enhanced palatability is appealing or pleasing not just to pets, but to pet owners as well.

The terms "palatability enhancers", "palatants", "flavours", "palatability agents", "appetizing factors", "flavour compositions", "palatability-enhancing compositions", "flavour enhancers", and any other similar terms mean any material that enhances the palatability of a food composition to an animal. A palatability enhancer may be a single material or a blend of materials, and it may be natural, processed or unprocessed, synthetic, or part of natural and part of synthetic materials. Typically, a palatability enhancer for animal food is an edible composition that provides an aroma, taste, aftertaste, smell, mouth feel, texture, and/or organoleptic sensation that is appealing or pleasing to the target animal.

The compositions containing fat or containing fat and animal digests that are disclosed below are palatability enhancers. Of interest, their palatability-enhancing effect is sustained over time.

A palatability enhancer may for example contribute to initial food appeal by its smell and/or to continued consumption by its smell but also by its taste and/or its aftertaste, and/or its mouth feel, and/or its texture. "Initial appeal" or "attractiveness" is an aspect of palatability that induces an animal to initially taste or try a food, and that can be measured by the criteria "first choice" or "first food consumed". This criterion identifies which food first attracts the pet to eat and is expressed as an absolute value. "Continued consumption" is an aspect of palatability that induces an animal to continue consuming a food that has been initially only tasted or tried. Continued consumption can be evaluated by determining a "consumption ratio" or "intake ratio". The "consumption ratio" measures the consumption of one food relative to another and is expressed as a relative value (see a detailed description of a method for assessing palatability below).

The term "animal" is used in a general sense and means a human or other animal that may choose an edible composition based upon its palatability, including avian, bovine, canine, equine, feline, lupine, murine, ovine, and porcine animals, thus encompassing pets.

The present invention preferably concerns pets.

The terms "pet" and "companion animal" are synonymous and mean any domesticated animal including, without limitation, cats, dogs, rabbits, guinea pigs, ferrets, hamsters, mice, gerbils, birds, horses, cows, goats, sheep, donkeys, pigs, and the like.

In the context of the present invention, dogs are preferred. However, the invention can be adapted for use with other classes of companion animals. If desired, the invention can be tested to evaluate its suitability for use with different classes of animals that may be considered as companion animals.

The term "food" as used herein means a product or composition that is intended for ingestion by an animal and provides at least one nutrient to the animal.

The term "food" includes any food, feed, snack, food supplement, treat, toy (chewable and/or consumable toys), meal substitute, or meal replacement. "Food" encompasses such products in any form, solids, liquids, gels, or mixtures or combinations thereof. Preferably, drinks and beverages are not encompassed within the term "food."

The terms "pet food" or "food for pet" mean a composition intended for consumption by a pet.

There are three main categories or classes of pet foods depending on their moisture content, which is either low or medium or high:
  dry or low moisture-containing products (having less than about 15% moisture): they usually produce a crunching sound when chewed by a pet; they are generally highly nutritious, may be inexpensively packaged (e.g., in bags or boxes), and are highly convenient to store and use;
  canned or wet or high moisture-containing products (having more than about 50% moisture): typically high meat-containing products; they are usually costly to produce and package (mainly in cans);
  semi-moist or semi-dry or soft dry or soft moist or intermediate or medium moisture-containing products (having from about 15 to about 50% moisture): usually packaged in appropriate bags or boxes.

Nutritionally-balanced pet foods are widely known and used in the art.

A "nutritionally-complete", "nutritionally-balanced" or "complete and nutritionally-balanced food" is one that contains all known required nutrients for the intended recipient or consumer of the food, in appropriate amounts and proportions based, for example, on recommendations of recognized or competent authorities in the field of companion animal nutrition. Such foods are therefore capable of serving as a sole source of dietary intake to maintain life, without the addition of supplemental nutritional sources.

The term "kibble" used herein refers to particulate chunks or pieces formed by either a pelleting or extrusion process. Typically, kibbles are produced to give dry and semi-moist pet food. The pieces can vary in sizes and shapes, depending on the process or the equipment. For instance, kibbles can have spherical, cylindrical, oval, or similar shapes. They can have a largest dimension of less than about 2 cm for example.

The term "chunk-in-"X" products" mean herein all edible foodstuffs comprising chunks in a preparation (said preparation being "the X preparation"). Classical examples thereof are chunk-in-jelly products, chunk-in-gravy products, and the like. This category of "chunk-in-X" products encompasses also edible forms other than chunks that may be contained in the X preparation such as a jelly, a gravy, and the like. For instance, other forms than chunks may be sliced products, grated products, etc.

The term "loaf" used herein refers to edible foodstuffs obtained as moist products, and includes terrines, pâtés, mousses, and the like.

The term "food supplement" or "dietary supplement" or "supplement" means a product that is intended to be ingested in addition to the normal animal diet. Dietary supplements may be in any form, e.g., solid, liquid, gel, tablets, capsules, powder, and the like. Preferably they are provided in convenient dosage forms. In some embodiments, they are provided in bulk consumer packages such as bulk powders, liquids, gels, or oils. In other embodiments, supplements are provided in bulk quantities to be included in other food items such as snacks, treats, supplement bars, beverages, and the like. Palatability-enhancing compositions can be used to improve palatability of dietary supplements in the same manner as they are used to improve palatability of nutritionally-balanced foods.

The term "treat" (or "biscuit") means any food item that is designed to be fed to a pet, preferably at non-meal time, by the owner to help, promote or sustain a bonding process between a pet and its owner. Examples of treats for dogs are bones. Examples of treats for cats are stuffed pillows and chewable sticks. Treats may be nutritional or not. Treats often contain palatability enhancers in a manner comparable to nutritionally-balanced foods.

"Toys" include, for example chewable toys. Examples of toys for dogs are artificial bones. Toys for cats are, for example, chewable. Toys further include partially consumable toys (e.g., comprising plastic components) or fully consumable toys (e.g., rawhides).

The term "animal digest" means herein material which results from chemical and/or enzymatic hydrolysis of clean, undecomposed animal tissue. In some embodiments, an animal digest as used herein is fully consistent with the definition promulgated by the Association Of American Feed Control Officials, Inc. (AAFCO). Animal digest is preferably derived from animal tissues, including cold-blooded marine animals, excluding hair, horns, teeth, hooves, and feathers. The skilled artisan will appreciate that while such tissues are not preferred, trace amounts might be found unavoidably even under good manufacturing practices. Also not included are visceral contents or foreign or fecal matter, although trace contaminant amounts are sometimes present. An animal digest may be dried or not. Examples of animal digests are:

digest of poultry (or pork, beef, sheep, lamb, fish, etc): material from poultry (pork, beef, etc) which results from chemical and/or enzymatic hydrolysis of clean and undecomposed tissue;

digest of pork (or beef, sheep, lamb, fish, etc) by-products: material from pork (beef, etc.) which results from chemical and/or enzymatic hydrolysis of clean and undecomposed tissue from non-rendered clean parts from cattle (pigs, sheep, lamb, etc), other than meat, for example lungs, spleen, kidneys, brain, livers, blood, bone, partially-defatted low-temperature fatty tissue, and stomachs and intestines, freed of their contents;

digest of poultry by-products: material which results from chemical and/or enzymatic hydrolysis of clean and undecomposed tissue from non-rendered clean parts of poultry, other than meat, such as livers, hearts, heads, feet, and viscera. As used herein, "poultry" encompasses any species or kind of bird, preferably chicken, turkey, duck, and the like; and digest of fish by-products: material which results from chemical and/or enzymatic hydrolysis of clean and undecomposed tissue from non-rendered clean parts from fish. As used herein, "fish" encompasses any species or kind of fish or crustaceans, preferably tuna, salmon, cod, whitefish, shrimp, sardine, and the like.

Animal digests may also be referred to as "animal products" or "animal by-products", all these terms being used herein as synonymous.

The terms "dairy products and by-products" include, without limitation, products and by-products derived from cheese, milk, whey, and the like.

The term "yeast" herein refers to any yeast, preferably inactive, as well as to yeast by-products that are compatible with compositions for animal consumption. Yeasts are well known in the art as being protein-rich. Yeasts include, without limitation, brewer's yeast, baker's yeast, torula yeast, molasses yeast, and the like. Yeast by-products include, without limitation, yeast extracts, yeast hydrolysates, cream yeasts, etc.

As used herein, a "pet food ingredient" is any compound, composition or material that is suitable for pet consumption. Non-limiting examples of pet food ingredients are palatability enhancers, animal digests, proteins, peptides, amino acids, grains, carbohydrates, fats or lipids, nutrients, antioxidants, preservatives, surfactants, texturing agents, colouring agents, flavors, seasonings, etc.

As used herein, a "pet food preparation" is any compound, composition or material that is used for preparing food products for pet consumption, i.e. pet food products. Non-limiting examples of pet food preparation include one or more ingredients chosen from the group of: palatability enhancers, animal digests, nitrogen compounds (e.g., proteins, peptides, and amino acids), carbohydrates, fats or lipids, nutrients, preservatives including anti-oxidants, surfactants, texturing or texturizing or stabilizing agents, colouring agents, inorganic phosphate compounds, etc. Such ingredients may be comprised as such in the pet food preparation, or they can be contacted into the preparation and react in situ for producing transformed materials that are also encompassed in the group of ingredients of a "pet food preparation". Examples of ingredients that react together in the preparation are, without limitation, nitrogen compounds and carbohydrates, so as to obtain transformed materials such as Maillard reaction products, and the like.

As used herein, a "palatability-enhancing composition ingredient" is any compound, composition or material that is suitable for pet consumption. Non-limiting examples of palatability-enhancing composition ingredients are animal digests, vegetarian palatability-enhancing composition ingredients, Maillard ingredients, Maillard reaction products, proteins, peptides, amino acids, carbohydrates, fats, nutrients, anti-oxidants, preservatives, surfactants, texturing agents, flavors, etc. Ingredients may be comprised as such in the palatability-enhancing composition, or they can be contacted into the composition and react in situ for producing transformed materials that are also encompassed by the term "palatability-enhancing composition ingredient". Examples of ingredients that react together in the composition are, without limitation, fats, peptides, amino acids, and carbohydrates, so as to obtain transformed materials such as Maillard reaction products, and the like.

As used herein, the term "Maillard reaction product" means herein any compound produced by a Maillard reaction. In particular, a Maillard reaction product is a compound that provides flavour and/or color and/or odor and/or taste and/or aftertaste.

The term «vegetarian palatability-enhancing composition ingredients» means herein materials free of meat or animal products, and derived from or isolated from plant, bacterial, fungal or algal sources, or single compounds not obtained from animal sources. Vegetarian palatability-enhancing composition ingredients can be dry or liquid. For example, a vegetarian palatability-enhancing composition ingredient can include:
  Inactivated yeasts and yeast derivatives such as yeast autolysates, yeast extracts;
  Vegetable or grain materials and derivatives, like soya and soya based materials such as soya concentrates and soya isolates, hydrolyzed vegetable proteins "HVP", corn and corn based materials like corn grain meal, corn aerian part meals, corn steep syrups, wheat and wheat based materials, potato meal, pea meals, tapioca, starches, modified starches;
  Plant oils such as canola oil, soybean oil, corn oil, olive oil, sunflower oil, linseed oil, palm oil, safflower oil, and the like, and by-products thereof;
  non animal originating fermented products;
  algal and algal derivatives;
  organic or mineral molecules or compounds that would not be originating from animals, and obtained through chemical, biochemical process. As examples, sugars, salts, amino acids obtained by fermentation or extraction from non-animal materials, and the like.

"Proteins" include all conventional protein sources that are compatible for animal consumption, especially plant or vegetable proteins, animal proteins (such as casein or albumin or animal digests), and microbial proteins (such as yeast or fungi or algal).

Examples of vegetable proteins are corn gluten, soy protein, soy flour, hydrolyzed vegetable protein (HVP), and the like.

Examples of grains are corn, milo, alfalfa, wheat, barley, rice, soy, and the like.

Examples of carbohydrates include dextrose, fructose, sucrose, polysaccharides, fibers, starches, and the like.

Examples of nutrients include, without limitation, vitamins, minerals and electrolytes, such as vitamins A, C, E, B12, D3, folic acid, D-biotin, cyanocobalamin, niacinamide, thiamine, riboflavin, pyridoxine, menadione, beta-carotene, calciumpantothenate, choline, inositol, calcium, potassium, sodium, zinc, iron, manganese, copper, iodine, and the like.

Anti-oxidants and preservatives are, for example, tocopherols, rosemary extract, potassium sorbate, sorbic acid, phosphoric acid, and the like.

"Surfactants" are molecules that are surface active. They typically have a hydrophilic portion (e.g., one or more head groups) and a hydrophobic (or lipophilic) portion (e.g., one or more tails). They are classified in various ways, for example according to their hydrophilic-lipophilic balance (HLB). They can also or alternatively be classified as non-ionic, ionic or zwitterionic compounds based on the presence or absence of formally-charged in the head group (s). Surfactants are well-known in the art. One can cite, for example, Tween surfactants. Surfactants include, without limitation, emulsifiers and wetting agents. In some instances, the terms "surfactants" and "emulsifiers" can be used interchangeably.

Examples of seasonings include corn syrup and molasses.

A "texturing agent" or "texturizing agent" or "stabilizing agent" is an ingredient that affects the texture or the mouthfeel of an edible product, e.g., a component that increases the viscosity of an edible product. Examples thereof are xanthan, alginate, carragheenans, guar gum, Arabic gum, and the like.

A "thermal reaction" is a reaction obtained by combining at an elevated temperature, at least one carbohydrate, preferably a reducing sugar, and at least one nitrogen compound (e.g., an amino acid). Such a reaction may actually include various concomitant and/or successive reactions, including, e.g., Maillard reaction(s). It is thus meant herein by the term "Maillard ingredient(s)" or "Maillard precursor(s)", one or more carbohydrates, preferably reducing sugars; and/or one or more nitrogen compounds. Indeed, Maillard ingredients are ingredients used to achieve one or more thermal reactions as defined above.

The term "carrier" means a usually inactive substance that is used in association with an active compound or mix of compounds. Under these circumstances, a "carrier" typically aids the application of said active compound or mix of compounds.

Alternatively, the term "carrier" can refer to a "carrier for concentrating" or "carrier for drying", encompassing conventional compounds that are well-known in the art to perform a concentration or a drying step in a given method.

Examples of "carriers for concentrating" or "carriers for drying" are microbial proteins (e.g., yeasts), animal proteins, vegetable proteins, carbohydrates (e.g., maltodextrin, cyclodextrin), as well as minerals or inorganic compounds, including inorganic phosphate compounds.

Of course, the exact meaning of the term "carrier" when used herein will be clear to the skilled artisan based on the context and in light of his general knowledge in the art.

"Coating", as used herein, refers to the topical deposition of the palatability-enhancing composition onto the surface of the basal food composition, such as by spraying, dusting, and the like.

"Inclusion" as used herein, refers to the addition of the palatability-enhancing composition internally to the pet food preparation, by mixing it with other pet food ingredients, before further processing steps for obtaining the final pet food product (including thermal treatment and/or extrusion and/or retorting, etc).

In the context of the present invention, fat may be treated mechanically and/or thermally and/or chemically and/or enzymatically. All these treatments actually involve hydrolysis of fat. If hydrolysis is complete, then glycerol and fatty acids (and/or modified versions thereof, such as salts) are released by breaking apart all the triglyceride ester bonds. If hydrolysis is partial, then the resulting mixture contains one or more molecules selected from triglycerides, diglycerides, monoglycerides, glycerol, and fatty acids (and/or modified versions thereof, such as salts).

Several types of chemical hydrolysis of oils and fats are well-known and widely used. One example thereof is "saponification", which comes from the same root word as "soap". This term refers to the treatment of a fat using a strong alkaline agent, such as caustic soda (also known as alkali, lye, sodium hydroxide, or NaOH).

Another way to hydrolyze fat is to use enzymes, in particular "lipase enzymes" or "lipases", as catalysts to cleave off fatty acids. Enzymatic fat hydrolysis can be achieved using one or more lipases, either concomitantly or sequentially. Lipases catalyze the hydrolysis of triglycerides to glycerol and fatty acids. Lipases can be from various origins: microbial lipases (e.g., lipases from microorganisms such as yeasts, fungi and bacteria), animal lipases (from kid, lamb, calf, pork), plant lipases (e.g., originating from seeds such as oat seeds and castor seeds), and the like. Commercially-available lipases are well-known in the art.

Fat can be hydrolyzed mechanically. Classically, the fatty acids are produced by the action of heat and pressure in the presence of water (e.g., see JP-A-2003-113395). One commonly-used commercial process for hydrolyzing fat is a high-temperature steam treatment method known as the "Colgate-Emery Steam Hydrolysis Process" (Brady et al. JAOCS 65:917-921 (1988)). This method and modifications thereof use a countercurrent reaction of water and fat under high temperatures ranging from about 240° C. to about 315° C. and high pressures in the range of about 700 to about 750 PSIG, for large-scale production of saturated fatty acids from fat.

Methods for mechanically and/or thermally and/or chemically and/or enzymatically hydrolyzing fat are not exclusive, which means that it is possible to combine one or more of these methods to achieve hydrolysis to a desired degree (complete or partial hydrolysis). For instance, high pressure and temperature hydrolysis (mechanical and thermal hydrolysis) usually has an induction period at an initial stage of the reaction before hydrolysis starts. To avoid or shorten the induction time, fat can first be partially hydrolyzed by enzymatic hydrolysis using an appropriate lipase to prepare partially-hydrolyzed fat which can in turn be submitted to high pressure and temperature hydrolysis.

The determination of "acid value" or "oleic acidity" is one of the most common analyses performed for evaluating the extent of fat hydrolysis (i.e., the degree of completeness of a fat hydrolysis reaction). The acid value is defined as the amount of free acids present in fat as measured by the milligrams of potassium hydroxide (KOH) required to neutralize the fatty acids of 1 g of fat, assuming that the fatty acids have the same molecular weight as oleic acid (MW=282). It is expressed in % of free fatty acids (considered as oleic acid) per g of fat (NF-EN ISO 660; see website www.boutique.afnor.org/normes).

"Containers" include, but are not limited to, bags, boxes, cartons, bottles, packages of any type or design or material, over-wrap, shrink-wrap, stapled or otherwise affixed components, or combinations thereof, that are used to store materials.

The term "single package" means that the components of a kit are physically associated in or with one or more containers and considered a unit for manufacture, distribution, sale, or use. A single package may be containers of individual components physically associated such that they are considered a unit for manufacture, distribution, sale, or use.

As used herein, a "means for communicating information or instructions" is a kit component under any form suitable for providing information, instructions, recommendations, and/or warranties, etc. Such a means can comprise a document, digital storage media, optical storage media, audio presentation, visual display containing information. The means of communication can be a displayed web site, brochure, product label, package insert, advertisement, visual display, etc.

DESCRIPTION OF THE INVENTION

As disclosed herein, the Inventors could find out advantageous recipes and procedures for preparing enhanced palatability-sustaining compositions for use in pet food, said compositions exhibiting sustained palatability-enhancing capacities upon storage over time.

In particular, the inventors have demonstrated that a fat composition having a C12:0/C10:0 fatty acid weight ratio from about 0.85 to about 2.5 and/or a C14:0/C12:0 fatty acid weight ratio from about 0.45 to about 4.3 exhibits sustained palatability-enhancing capacities upon storage over time, both alone, in combination with other palatability-enhancing ingredients in a palatability enhancer and also in combination with a pet food preparation in a pet food.

Thus, in a first aspect, the present invention concerns the use of a fat composition (in particular in a pet food, preferably with the exception of a drink fat composition and of a beverage fat composition) for sustaining an enhanced palatability of a pet food (food for pet) over time (in particular in comparison with said pet food which does not comprise said fat composition), wherein said fat composition has a C12:0/C10:0 fatty acid weight ratio from about 0.85 to about 2.5, in particular from 0.85 to 2.5 and/or a C14:0/C12:0 fatty acid weight ratio from about 0.45 to about 4.3, in particular from 0.45 to 4.3. Particularly, said fat composition comprises C10:0, C12:0 and C14:0 fatty acids.

The fat composition of the invention has in particular the following advantages:
  It can be used alone as a palatability enhancer or in combination with other palatability-enhancing ingredients in a palatability enhancer, said palatability enhancer exhibiting sustained palatability-enhancing capacities upon storage over time. In fact, said palatability enhancer can be stored several months before being added to a pet food preparation (to obtain a pet food) while still exhibiting palatability-enhancing capacities. Thus, it allows the provision of a palatability enhancer particularly suitable for import and export;
  It can be used (alone or in combination with other palatability-enhancing ingredients) further in combination with a pet food preparation to obtain a pet food which can be stored several months while still exhibiting enhanced palatability to pets. Thus it allows the provision of a pet food exhibiting sustained enhanced palatability to pets up to the use-by date.

The C12:0/C10:0 fatty acid weight ratio is the lauric acid (dodecanoic acid)/capric acid (decanoic acid) ratio.

The C14:0/C12:0 fatty acid weight ratio is the myristic acid (tetradecanoic acid)/lauric acid (dodecanoic acid) ratio.

Advantageously, said fat composition has a C12:0/C10:0 fatty acid weight ratio from about 0.85 to about 2.5, particularly from 0.85 to 2.5 and a C14:0/C12:0 fatty, acid weight ratio from about 0.45 to about 4.3, particularly from 0.45 to 4.3.

Particularly, said C12:0/C10:0 fatty acid weight ratio is from about 0.85 to about 2.1, from 0.85 to 2.1 more particularly, from about 0.85 to about 1.9, from 0.85 to 1.9, even more particularly from about 0.85 to about 1.7, from 0.85 to 1.7 and even more particularly, from about 1 to about 1.7, from 1 to 1.7.

Particularly, said C14:0/C12:0 fatty acid weight ratio is from about 0.55 to about 4.3, from 0.55 to 4.3, more particularly from about 0.65 to about 4.3, from 0.65 to 4.3, even more particularly, from about 0.85 to about 4.3, from 0.85 to 4.3, even more particularly, from about 1.30 to about 4.3, from 1.30 to 4.3, even more particularly, from about 1.85 to about 4.3, from 1.85 to 4.3, even more particularly from about 2.4 to about 4.3, from 2.4 to 4.3, even more particularly from about 3 to about 4.3, from 3 to 4.3. As a yet more particularly embodiment, said C14:0/C12:0 fatty acid weight ratio is from about 3 to about 4, from 3 to 4.

Particularly, said fat composition comprises at least 0.1%, at least 0.5%, at least 1%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, more particularly at least 99%, at least 99.5%, at least 99.9% by weight of fatty acids based on the total weight of said fat composition.

According to one embodiment, said fat composition comprises an at least partially-hydrolyzed fat, particularly a hydrolyzed fat. In particular, the oleic acidity of said fat composition is from about 8 to 100%, particularly from 8 to 100%, preferably from about 10 to 100%, from 10 to 100%, more preferably from about 12 to 100%, from 12 to 100% and even more preferably from about 14 to 100%, from 14 to 100%.

At least partial hydrolysis of fat can be achieved as defined above, i.e., mechanically and/or thermally and/or chemically and/or enzymatically.

In the context of the present invention, the palatability-enhancing effect of the fat composition is sustained over time. This means that the fat composition is efficient for enhancing pet food palatability not only from its manufacturing but also after storage. Thus, on the one hand, the fat composition can be prepared and immediately added to a food preparation for pet (no storage over time of the fat composition), or it can be prepared, stored during a period of time, and then added to a food preparation for pet. On the other hand, the fat composition can be prepared and immediately mixed with other palatability-enhancing composition ingredients (such as animal digests, see below) to prepare a palatability enhancer to be added to a food preparation for pet (no storage over time of the fat composition), or it can be prepared, stored during a period of time, and then mixed with other palatability-enhancing composition ingredients to prepare such a palatability enhancer to be added to a food preparation for pet. In particular, the storage period of time wherein the palatability-enhancing effect of the fat composition is sustained is of at least about 1.5 months, preferably of at least about 3 months, yet preferably of at least about 5 months, yet more preferably of at least about 6 months, yet even more preferably of at least about 8 months in an appropriate container at ambient temperature. In yet a preferred embodiment, said fat composition is stored over at least about 12 months in an appropriate container at ambient temperature.

In a particular embodiment, the palatability-enhancing effect of said fat composition (particularly comprising at least 10% by weight of fatty acids based on the total weight of said fat composition) is sustained over at least about 12 months, in particular at least 12 months, of storage of said fat composition before its addition to a pet food preparation thereby forming said pet food, particularly in an appropriate container at ambient temperature.

Appropriate storage conditions for such a fat composition are well-known in the art. In practice, the skilled artisan can reproduce or easily adapt standard conditions that are used for storing conventional palatability enhancers.

The fat composition is stored under ambient temperature.

An "ambient temperature" is typically a temperature ranging from about 15 to about 25° C., from 15 to 25° C., preferably from about 17 to about 23° C., from 17 to 23° C., yet preferably from about 19 to about 21° C., from 19 to 21° C., yet more preferably from about 20° C., from 20° C. In the context of the present invention, it is however of note that a storage temperature up to about 40° C. has no impact on the enhanced-palatability sustaining effect of the fat composition over a period of at least 3 months (see Examples below).

An appropriate container for storing the fat composition depends on the form thereof, i.e., whether the fat composition is a liquid or a powder. An appropriate container for a liquid fat composition is, for instance, a barrel or a bucket. Examples of appropriate containers for a powder fat composition are bags.

Advantageously, the fat composition is submitted to one or more processing steps chosen from, inter alia:
- the addition of further ingredients: in particular, at least one palatability-enhancing composition ingredients, including Maillard ingredients, Maillard reaction products, animal digests, vegetarian palatability-enhancing composition ingredients, etc.; and
- heat treatment to achieve, e.g., further fat hydrolysis and/or thermal reaction(s) and/or pasteurisation. In particular, said heat treatment step can be performed at a temperature ranging from 80° C. to 300° C. and for a period ranging from 30 sec to 48 hours.

Thus, said fat composition can further comprise one or more ingredients.

In particular, said fat composition can comprise at least one palatability-enhancing composition ingredient, particularly selected from the group consisting of animal digests, vegetarian palatability-enhancing composition ingredients, Maillard ingredients and Maillard reaction products, particularly animal digests.

In particular, it can comprise one or more animal digests, resulting in a fat/animal digest(s) composition.

Preferably, this fat composition further comprising palatability-enhancing composition ingredient(s), in particular animal digest(s), has a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3.

Advantageously, said fat composition further comprising palatability-enhancing composition ingredient(s), in particular animal digest(s) has a C12:0/C10:0 fatty acid weight ratio from about 0.85 to about 2.5, particularly from 0.85 to 2.5 and a C14:0/C12:0 fatty acid weight ratio from about 0.45 to about 4.3, particularly from 0.45 to 4.3.

The preferred ranges for the C12:0/C10:0 and C14:0/C12:0 ratios that are disclosed above in connection with the fat composition, also apply to the fat/animal digest(s) composition.

In particular, the weight ration of the total fatty acids to the palatability-enhancing composition ingredient(s) is from 0.1:99.9 to 99.9:0.1, particularly from 1:99 to 99:1, more particularly from 10:90 to 90:10.

The palatability-enhancing effect of said fat composition further comprising palatability-enhancing composition ingredient(s), in particular animal digest(s) is sustained over time. In other words, the fat/animal digest(s) composition can be prepared and immediately added to a food preparation for pet (no storage over time of the fat/animal digest(s) composition), or it can be prepared, stored during a period of time, and then added to a food preparation for pet. In particular, the storage period of time wherein the palatability-enhancing effect of the fat/animal digest(s) composition is sustained is of at least about 2.5 months, preferably of at least about 4 months, yet preferably of at least about 5 months, yet more preferably of at least about 6 months in an appropriate container at ambient temperature. In a particular embodiment, the palatability-enhancing effect of said fat composition comprising at least one palatability-enhancing composition ingredient, is sustained over at least about 6 months, in particular at least 6 months, of storage of said fat composition before its addition to a pet food preparation thereby forming said pet food, particularly in an appropriate container at ambient temperature.

Ambient temperature for storing a fat/animal digest(s) composition is as defined above. However, a storage temperature up to about 40° C. has no impact on the enhanced-palatability sustaining effect of the fat/animal digest(s) composition over a period of at least 4 months (see Examples below).

Other storage conditions (e.g., containers) for a fat/animal digest(s) composition are as described above in connection with a fat composition. In particular, appropriate containers for storing the fat/animal digest(s) composition here again depend on the form thereof, i.e., whether the fat/animal digest(s) composition is a liquid or a powder. In particular, appropriate containers for storing fat composition are bags, boxes, tanks, barrels.

Advantageously, the fat or fat/animal digest(s) composition (that is referred to in the claims as the "composition") is added to a pet food preparation (food preparation for pet), thereby forming a pet food (food for pet) having an enhanced palatability sustained over time.

Enhanced palatability of the pet food (food for pet) is sustained over time. This means that the pet food (food for pet) has an enhanced palatability not only from its manufacturing but also after storage. Thus, the pet food can be prepared and immediately used for feeding pet (no storage over time of the pet food), or it can be prepared, stored during a period of time, and then used for feeding pet. In particular, the storage period of time wherein enhanced palatability of the pet food is sustained is of at least about 0.25 month, preferably of at least about 0.5 month, yet preferably of at least about 1 month, yet more preferably of at least about 1.5 months, yet even more preferably of at least about 2 months, yet even more preferably of at least about 2.5 months, yet even more preferably of at least about 3 months, yet even more preferably of at least about 4 months, yet even more preferably of at least about 6 months, yet even more preferably of at least about 8 months, yet even more preferably of at least about 10 months, yet even more preferably of at least about 12 months in an appropriate container at ambient temperature. In yet preferred embodiments, said pet food is stored over at least about 15, preferably over at least 18 months in an appropriate container at ambient temperature. Thus, particularly, said enhanced palatability of said pet food (in comparison with said pet food which does not comprise said fat composition) is sustained over at least about 15 months, particularly at least 15 months, of storage of said pet food, particularly in an appropriate container at ambient temperature.

Appropriate storage conditions for such a pet food (food for pet) are well-known in the art. In practice, the skilled artisan can reproduce or easily adapt standard conditions that are used for storing conventional pet foods.

The pet food is stored under ambient temperature as described above with respect to the fat composition.

An appropriate container for storing the pet food depends on the form thereof, i.e., whether the pet food is dry or wet or semi-moist. As yet mentioned above, examples of appropriate containers are bags or boxes for dry and semi-moist pet food and cans for wet pet food.

The fat and fat/animal digest(s) compositions (that are referred to in the claims as the "compositions") are useful in pet foods such as nutritionally-balanced mixtures containing appropriate pet food ingredients including proteins, fibres, carbohydrates and/or starch, etc. Such mixtures are well known to those skilled in the art, and their composition depends on many factors such as, for example, the desired food balance for the specific type of pet. Additional pet food ingredients may include other palatability enhancers, vitamins, minerals, seasonings, preservatives, and surfactants. The food balance, including the relative proportions of vitamins, minerals, lipids, proteins and carbohydrates, is determined according to the known dietary standards in the veterinary field, for example by following recommendations of the National Research council (NRC), or the guidelines of the American Association of Feed Control Officials (AAFCO).

Dry pet food products such as kibbles can commonly be prepared by different methods. One of these methods, that is widely used, is a cooker-extruder method. In the cooker-extruder method, ingredients are first blended together to form an admixture. This admixture is transferred into a steam conditioner where it is sufficiently moistened to become extrudable. The admixture then enters a cooker-extruder where it is cooked at an elevated temperature and pressure and then forced out of the apparatus through a die. This die forms the extruder product into a specific shape. Individual pieces of food are created by periodically slicing off the end of the extruded stream of product. The individual pieces are then dried in a hot air dryer. Generally, the product is dried until it contains less than 15% moisture, and preferably about 4 to 10% moisture. The dried particles or pieces are then transferred by bulk conveyor to a coating drum and sprayed with fat. Other liquids, such as, for example, phosphoric acid may alternatively be applied to the pieces, or applied in addition to the fat. The resulting pellets or kibbles constitute the basal pet food preparation, the palatability of which will be enhanced over time using the herein disclosed fat and fat/animal digest(s) compositions.

Moist pet foods that are gravy-based or jelly-based can be prepared by grinding meat, meat mimetics, meat by-products, carbohydrates and/or grains, texturing agents, and forming the ground mixture via low pressure extrusion, then cooking through a steaming tunnel. At the tunnel outlet, the mixture is cut into pieces. The gravy- or jelly-type matrix is added to the resulting pieces, then sealed in cans or pouches and retorted, so as to obtain chunks-in gravy or chunks-in jelly food products.

Moist pet foods that are not gravy-based or jelly-based can be prepared by grinding meat, meat mimetics, meat by-products, carbohydrates and/or grains, and mixing with water and texturing agents. Then, the overall mixture is sealed in cans and retorted, so as to obtain loaves.

Fat and fat/animal digest(s) compositions (that are referred to in the claims as the "compositions") can be added to the pet food or to the pet food preparation either by coating or by inclusion.

For example, one can cite a method for coating dry pet foods such as kibbles. Kibbles of uncoated, extruded basal pet food can be placed in a container such a tub or a coating drum for mixing. A fat such as pork fat or poultry fat (herein called a "first fat") is heated and then sprayed onto the pet food in a manner to obtain a coating of the kibbles. The coating need not be a continuous layer, but preferably is uniform. After the first fat, a fat or fat/animal digest(s) composition may be applied as either a liquid or a powder, while the product is mixing. A liquid fat or fat/animal digest(s) composition is typically sprayed on while a powder fat or fat/animal digest(s) composition is typically dusted on. Alternatively, fat or fat/animal digest(s) compositions can be mixed with the first fat and applied concurrently. Yet alternatively, fat or fat/animal digest(s) compositions are coated before deposition of the first fat.

Alternatively, fat or fat/animal digest(s) compositions can be incorporated or included into the pet food preparation according to the following illustrative method. The fat or fat/animal digest(s) composition is contacted with the raw ingredients of the pet food preparation prior to cooking. In this case, the fat or fat/animal digest(s) composition is combined to proteins, fibre, carbohydrates and/or starch, etc., of the basal food preparation and is cooked with those materials in the cooker-extruder.

Inclusion into moist pet foods can be achieved as follows. The fat or fat/animal digest(s) composition can be applied in a gravy- or jelly-type matrix during the blending process in addition to the other pet food ingredients. The fat or fat/animal digest(s) composition can also be applied into a meat-by mixtures for chunks or loaf preparation. In this case, it can be added to raw materials before or after the grinding process. The meat-by mixture may be cooked in a steam or grilling oven in the case of chunks manufacturing, or directly sealed in cans in the case of loaf manufacturing.

Another aspect of the present invention relates to a method for preparing an enhanced palatability-sustaining fat composition for use in a pet food (food for pet) (in particular with the exception of a drink enhanced palatability-sustaining fat composition and a beverage enhanced palatability-sustaining fat composition), said method comprising:
a) providing palatability-enhancing composition ingredients;
b) if necessary, grinding one or more of said ingredients;
c) providing at least one fat, particularly having a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3 and in particular comprising C10:0, C12:0 and C14:0 fatty acids;
d) mixing said fat of step c) with said ingredients of step a) and/or step b); and
e) obtaining said enhanced palatability-sustaining fat composition,
wherein said composition has a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3, and in particular wherein said composition comprises C10:0, C12:0 and C14:0 fatty acids.

In other words, said method for preparing an enhanced palatability-sustaining fat composition for use in a pet food according to the invention, comprises:
a) providing at least one palatability-enhancing composition ingredient;
c) providing at least one fat, particularly having a C12:0/C10:0 fatty acid weight ratio from 0.85 to 2.5 and/or a C14:0/C12:0 fatty acid weight ratio from 0.45 to 4.3 and in particular comprising C10:0, C12:0 and C14:0 fatty acids;
d) mixing said fat with said palatability-enhancing composition ingredient; and
e) obtaining said enhanced palatability-sustaining fat composition,
wherein said palatability-sustaining fat composition has a C12:0/C10:0 fatty acid weight ratio from 0.85 to 2.5 and/or a C14:0/C12:0 fatty acid weight ratio from 0.45 to 4.3, and in particular wherein said enhanced palatability-sustaining fat composition comprises C10:0, C12:0 and C14:0 fatty acids. Said method can further comprise the step b) of grinding at least one palatability-enhancing composition ingredient.

Particularly, said palatability-enhancing composition ingredient can be selected from the group consisting of animal digest, vegetarian palatability-enhancing composition ingredients, Maillard ingredients and Maillard reaction products, in particular animal digests.

Particularly said fat (of step c)) can be comprised in a fat composition having a C12:0/C10:0 fatty acid weight ratio from 0.85 to 2.5 and/or a C14:0/C12:0 fatty acid weight ratio from 0.45 to 4.3 and in particular comprising C10:0, C12:0 and C14:0 fatty acids.

Preferably, said fat composition has an enhancing-palatability effect sustained over at least about 12 months of storage of said fat composition, particularly in an appropriate container at ambient temperature.

In one embodiment, said fat in step c) above comprises an at least partially-hydrolyzed fat.

In the method above, the grinding conditions for step b) and the mixing conditions for step d) are conventional and can easily be determined by the one skilled in the art.

The method above can further comprise one or more of the following steps:
f) mechanically and/or thermally and/or chemically and/or enzymatically hydrolyzing the fat of step c) before step d) or the mix resulting from step d);
g) thermally treating the mixture resulting from step a), d) or f);
h) further stabilizing the resulting composition of step d), f) or g); and
i) drying the composition obtained from step d), f), g) or h).
In step g), thermal treatment notably allows thermal reactions to occur in the mixture. It can be performed at a temperature ranging from 80° C. to 300° C. and for a period ranging from 30 sec to 48 hours.

The stabilization of step h) can be either a microbial or a chemical or a textural or a microbial and a chemical and a textural stabilization, all of which being well-known in the art. Step h) is performed under classical conditions. Microbial stabilization may be achieved by, e.g., the addition of potassium sorbate, or phosphoric acid. Chemical stabilization may be achieved by, e.g. the addition of anti-oxidants. Textural stabilization may be achieved by, e.g., the addition of xanthan or carragheenans.

Drying step i) is routine for the skilled artisan. Typically, drying is performed so as to remove any excess water. In particular, the resulting water content is less than or equal to about 10%, preferably from about 1 to about 8%, by weight of the thus obtained dry composition. For example, a dry composition is obtained by combining the mixture resulting from step d) or f) or g) or h), with carriers as defined above in appropriate proportions, and by blending the components. The mixture is then dried by evaporation at an appropriate temperature, and a dry composition is obtained.

Another aspect of the present invention concerns an enhanced palatability-sustaining fat composition for use in a pet food (food for pet) obtainable by a method as described above.

As a further aspect, the present invention is related to a method for preparing an enhanced palatability-sustaining fat composition (in particular with the exception of a drink enhanced palatability-sustaining fat composition and a beverage enhanced palatability-sustaining fat composition) further comprising animal digest(s) for use in a pet food (food for pet), comprising:

a) providing a fat composition having a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3 and in particular comprising C10:0, C12:0 and C14:0 fatty acids;
b) providing one or more palatability-enhancing composition ingredient, in particular animal digests;
c) mixing said palatability-enhancing composition ingredient, in particular animal digests, of step b) with said fat composition of step a); and
d) obtaining said enhanced palatability-sustaining fat composition further comprising palatability-enhancing composition ingredient(s), in particular animal digest(s).

Preferably, said enhanced palatability-sustaining fat composition further comprising palatability-enhancing composition ingredient(s), in particular animal digest(s) has a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3 and in particular comprises C10:0, C12:0 and C14:0 fatty acids.

Preferably, it has an enhancing-palatability effect sustained over at least about 6 months of storage in an appropriate container at ambient temperature.

In particular, said enhanced palatability-sustaining fat composition is for use in a pet food, i.e. is added to a pet food preparation to obtain a pet food having an enhanced palatability sustained over time that can be used to feed pets.

Preferably, said fat composition of step a) is prepared using a method as described above.

In some embodiments, the method above further comprises:

e) providing one or more additional animal digests;
f) mixing said animal digests of step e) with said fat composition further comprising animal digest(s) of step d);
g) obtaining another enhanced palatability-sustaining fat composition further comprising animal digest(s);
h) optionally, providing one or more additional animal digests;
i) optionally, mixing said animal digests of step h) with said fat composition further comprising animal digest(s) of step g);
j) optionally, obtaining yet another enhanced palatability-sustaining fat composition further comprising animal digest (s);

optionally, and so on . . . .

In these embodiments, all thus-obtained enhanced palatability-sustaining fat composition comprising palatability-enhancing composition ingredient(s), particularly animal digest(s), preferably have a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3 and in particular comprise C10:0, C12:0 and C14:0 fatty acids.

Preferably, they all have an enhancing-palatability effect sustained over at least about 6 months of storage in an appropriate container at ambient temperature.

The method for preparing an enhanced palatability-sustaining fat composition comprising palatability-enhancing composition ingredient(s), particularly animal digest(s) can further comprise one or more of the following steps:

k) mechanically and/or thermally and/or chemically and/or enzymatically hydrolyzing the mix resulting from step c);
l) thermally treating the mixture resulting from step a), c), f), i) or k);
m) further stabilizing the resulting composition of step c), f), i), k) or l); and
n) drying the composition obtained from step c), f), i), k), l) or m).

In step l), thermal treatment allows thermal reactions to occur in the mixture.

The stabilization of step m) can be either a microbial or a chemical or a textural or a microbial and a chemical and a textural stabilization, all of which being well-known in the art. Step m) is performed under classical conditions. Microbial stabilization may be achieved by, e.g., the addition of potassium sorbate, or phosphoric acid. Chemical stabilization may be achieved by, e.g. the addition of anti-oxidants. Textural stabilization may be achieved by, e.g., the addition of xanthan or carragheenans. Drying step n) is routine for the skilled artisan. Typically, drying is performed so as to remove any excess water. In particular, the resulting water content is less than or equal to about 10%, preferably from about 1 to about 8%, by weight of the thus obtained dry composition. For example, a dry composition is obtained by combining the mixture resulting from step c) or f) or i) or k) or l) or m), with carriers as defined above in appropriate proportions, and by blending the components. The mixture is then dried by evaporation, and a dry composition is obtained.

Another aspect of the present invention concerns an enhanced palatability-sustaining fat composition further comprising animal digest(s) for use in a food for pet obtainable by a method as described above.

Yet another aspect of the present invention is directed to a method for preparing a pet food (food for pet) having an enhanced palatability sustained over time (in particular with the exception of a pet drink having an enhanced palatability sustained over time and a pet beverage having an enhanced palatability sustained over time), comprising:

i) providing:
  at least one enhanced palatability-sustaining fat composition (comprising or not at least one palatability-enhancing composition ingredient) according to the invention; and/or
  at least one fat having a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3 and in particular comprising C10:0, C12:0 and C14:0 fatty acids;

ii) providing pet food preparation (a food preparation for pet);
iii) adding said enhanced palatability-sustaining fat composition and/or said fat (of step i)) to said pet food preparation (of step ii)); and
iv) obtaining said pet food (food for pet).

Preferably, said pet food has an enhanced palatability sustained over at least about 15 months of storage of said pet food, particularly in an appropriate container at ambient temperature, in comparison with said pet food which does not comprise said fat composition.

Particularly, said pet food comprises C10:0, C12:0 and C14:0 fatty acids.

Particularly, the mixture (of step i)) of:
said at least one enhanced palatability-sustaining fat composition (comprising or not at least one palatability-enhancing composition ingredient) according to the invention; and
said at least one fat having a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3, and in particular comprising C10:0, C12:0 and C14:0 fatty acids;
has a C12:0/C10:0 fatty acid weight ratio from about 0.85 to about 2.5, particularly from 0.85 to 2.5 and/or a C14:0/C12:0 fatty acid weight ratio from about 0.45 to about 4.3, particularly from 0.45 to 4.3, and in particular comprises C10:0, C12:0 and C14:0 fatty acids.

The method for preparing a pet food having an enhanced palatability sustained over time can further comprise one or more of the following steps:
v) mechanically and/or thermally and/or chemically and/or enzymatically hydrolyzing the fat of step i);
vi) thermally treating the fat of step i); Particularly, it can be performed at a temperature ranging from 80° C. to 300° C. and for a period ranging from 30 sec to 48 hours.

As a further aspect, the present invention concerns a pet food (food for pet) having an enhanced palatability sustained over time obtainable by a method as described above.

Another aspect of the present invention concerns a method for feeding pets comprising at least:
α) providing a food for pet as disclosed herein; and
β) feeding said food to pets.

Yet another aspect of the present invention relates to a kit for sustaining an enhanced palatability of a food for pet comprising, in one or more containers in a single package:
one or more enhanced palatability-sustaining fat compositions and/or one or more enhanced palatability-sustaining fat compositions further comprising animal digest(s), according to the present invention; and
optionally, at least one pet food ingredient.

In one embodiment, the kit further comprises a means for communicating information about or instructions for using said enhanced palatability-sustaining fat compositions and, optionally, said pet food ingredient.

The present invention will be further described by reference to the following examples, which are presented for the purpose of illustration only and are not intended to limit the scope of the invention.

EXAMPLES

A—Method of Palatability Assessment: The "Two-Bowl" Test

A—1—Principle of the Two-Bowl Test:
The test is based on the postulate whereby the more food consumed, the more palatable it is.

Individual versus (Two bowls) appetence tests, based on the comparison between two foods, were carried out. Tests are performed either on panel of 36 dogs or on panel of 40 cats, depending on the test's objectives.

A-2—Operating Method of the Test:
Identical amounts of food product A and food product B were weighed out and placed in identical bowls. The amount present in each ration enables the daily requirements to be met.
Distribution of the Bowls:
Dog test: the bowls were placed in an individual feed trough accessible to dogs.
Cat test: The bowls were presented at the same time to each cat in an individual loose box and their positions were switched at each meal to avoid a choice led by handedness.
Duration of the Test:
Cat test for dry food: from about 15 minutes to about 20 hours (if one of the two bowls was entirely eaten before the end of the test, the two bowls were removed, and the test was stopped);
Cat test for wet food: from about 15 minutes to about 30 minutes (if one of the two bowls was entirely eaten before the end of the test, the two bowls were removed, and the test was stopped);
Dog test: from about 15 minutes to about 30 minutes (if one of the two bowls was entirely eaten before the end of the test, the two bowls were removed, and the test was stopped). Parameters studied
Measured parameters: First food consumed ("attractiveness") and amount of each food consumed by the end of the test;
Calculated parameters: individual consumption ratio in % (CR)

$$CR_A = \text{consumption of } A(g) \times 100/(\text{consumption of } A+B)(g)$$

$$CR_B = \text{consumption of } B(g) \times 100/(\text{consumption of } A+B)(g);$$

Average consumption ratio (ACR)=average of all individual ratios (an equal importance is given to each animal, regardless of its size and of its corresponding consumption).

If animals have higher or lower consumption compared to predetermined values (which are function of, e.g., the animal weight and/or metabolism), they are not taken into account into statistical treatment.

A-3—Statistical Analysis:
Statistical analysis was used to determine if there was a significant difference between the 2 ratios. A Student's t-test with 3 error thresholds, namely 5%, 1% and 0.1%, was performed.

A Chi-square test was used to determine if there was a significant difference between the number of pets with Food A as first food eaten and the number of pets with Food B as first food eaten.

Significance levels are noted as below:

| NS  | not significant         | ($p > 0.05$)   |
|-----|-------------------------|----------------|
| *   | significant             | ($p \leq 0.05$)  |
| **  | highly significant      | ($p \leq 0.01$)  |
| *** | very highly significant | ($p \leq 0.001$) |

The Examples below illustrate the enhancing effect sustained over time of fat compositions having a C12:0/C10:0 fatty acid weight ratio from about 0.85 to about 2.5 and/or a C14:0/C12:0 fatty acid weight ratio from about 0.45 to about 4.3, on palatability to pets of food products prepared using said fat compositions.

In all Examples below, a "fresh" composition or a "fresh" food has not been stored (i.e., freshly prepared), as opposed to a composition or a food that is stored over time.

B— Examples

Fresh "PE 2" was then used to prepare a food for pet as follows.

A nutritionally-balanced food composition in the form of kibbles, suitable for consumption by dogs and obtained after an extrusion and drying process, was prepared. The control foods were coated with 3% of the animal digest "PE 1" and the experimental foods were coated with 3.5% of the fat/animal digest composition "PE 2".

So, here, "PE 0" was stored and samples thereof were taken and mixed at each time point with a fresh "PE 1" to

| C12:C10 | C14:C12 | Products stored | Exemples | Tables | Results/Target = palatability enhanced & sustained |
|---|---|---|---|---|---|
| 1.14 | 3.23 | Fat composition "PE 0" | 1 | 1 | At ambient temperature, target reached until 8 months (not tested after) |
| | | | | 2 | At 30° C., target reached until 5 months (not tested after) |
| | | | | 3 | At 40° C., target reached until 3 months (not tested after) |
| 1.14 | 3.8 | Fat/animal digest composition "PE 2" | 2 | 4 | At ambient temperature, Palatability enhanced and sustained until 6 months (not tested after) |
| | | | | 5 | At ambient temperature, target reached until 8 months (not tested after) |
| | | | | 6 | At 30° C., target reached until 2.5 months |
| | | | | 7 | At 40° C., target reached until 2.5 months |
| | | Kibbles "PE 2" | 3 | 8 | At ambient temperature, target reached until 3 months (not tested after) |
| 1.07 | 3.09 | Fat composition "PE 00" | 4 | 9 | At ambient temperature, target reached until 12 months |
| | | | | 10 | At 40° C., target reached until 6 months (not tested after) |
| 1.07 | 3.62 | Fat/animal digest composition "PE 12" | 5 | 11 | At ambient temperature, target reached until 6 months |
| | | Kibbles "PE 12 bis" | 6 | 12 | At ambient temperature, target reached until 15 months |
| 1.7 | 3.9 | Fat/animal digest composition "PE 52" | 15 | 20 | At ambient temperature, target reached until 1 month (not tested after) |
| 0 | 11 | Fat composition "PE 20" | 9 | 15 | At ambient temperature, target reached until 6 months |
| 0 | 28 | Fat/animal digest composition "PE 22" | 10 | 16 | At ambient temperature, target reached until 1.5 months |
| | | Kibbles "PE 22" | 7 | 13 | At ambient temperature, target reached until 6 months |
| 0 | 37 | Fat composition "PE 30" | 11 | 17 | At ambient temperature, target not reached |
| 0 | 54 | Fat/animal digest composition "PE 32" | 12 | 18 | At ambient temperature, target not reached |
| | | Kibbles "PE 32" | 8 | 14 | At ambient temperature, target reached until 1.5 months |
| 0 | 5 | Fat composition "PE 40" | | | |
| 0 | 13.5 | Fat/animal digest composition "PE 42" | | | |
| | | Kibbles "PE 42" | 13 | 19 | At ambient temperature, target reached until 1.5 months |
| 0 | 9 | Fat/animal digest composition "PE 62" | 15 | 20 | At ambient temperature, target not reached |

B—1—Example 1—Storage of Fat Composition "PE 0", According to the Invention

A fat composition, according to the invention, designated below as "PE 0", was prepared by enzymatic hydrolysis, this fat composition having a C12:0/C10:0 fatty acid weight ratio of 1.14 and a C14:0/C12:0 fatty acid weight ratio of 3.23.

This fat composition "PE 0" was stored at ambient temperature over time.

At different time points during the storage of "PE 0", a fat/animal digest composition "PE 2", according to the invention, was prepared by mixing a fresh animal digest "PE 1" with stored "PE 0" (PE 2=85% PE 1+15% PE 0), this fat/animal digest composition "PE 2" having a C12:0/C10:0 fatty acid weight ratio of 1.14 and a C14:0/C12:0 fatty acid weight ratio of 3.80.

The digest "PE 1" was a liquid palatability enhancer of high palatability, containing poultry liver hydrolysate.

obtain "PE 2" which was used fresh to prepare a food, the palatability for dog of which was then tested without having been stored.

Palatability tests were thus performed at different time points corresponding to the storage periods of "PE 0".

As shown in Table 1 below, consumption was significantly different between control and experimental foods, demonstrating the higher palatability for dog of the experimental foods containing the stored fat composition "PE 0". The palatability results clearly showed that the addition of the fat composition "PE 0", according to the invention, strongly enhanced palatability of the animal digest "PE 1", even when "PE 0" was stored during 8 months at ambient temperature. In this case, measures were not realized after 8 months of storage.

TABLE 1

Storage of "PE 0", according to the invention, at ambient temperature and comparison to a fresh "PE 1"

| Storage duration of PE 0 (months) | Food A- control (PE 1) | Food B- experimental (PE 2 = 85% PE 1 + 15% PE 0) | 1rst choice | Consumption ratio % A | % B | Statistical significance | Number of validated animals |
|---|---|---|---|---|---|---|---|
| 0   | 3% PE 1 | 3.5% PE 2 | B ** | 33 | 67 | * | 26 |
| 1.5 | 3% PE 1 | 3.5% PE 2 | B ** | 28 | 72 | ** | 28 |
| 3   | 3% PE 1 | 3.5% PE 2 | B ** | 22 | 78 | *** | 28 |
| 5   | 3% PE 1 | 3.5% PE 2 | B *** | 16 | 84 | *** | 34 |
| 8   | 3% PE 1 | 3.5% PE 2 | B ** | 31 | 69 | ** | 31 |

As shown in Tables 2 and 3 below, the same palatability-enhancing effect was obtained when the fat composition "PE 0" was stored at 30° C. during 5 months or at 40° C. during 3 months, respectively (no measure realized after). Thus, a sustained palatability-enhancing effect was generally obtained using the fat composition "PE 0", demonstrating the positive effect of a fat composition with a C12:0/C10:0 fatty acid weight ratio from about 0.85 to 2.5 and/or a C14:0/C12:0 fatty acid weight ratio from about 0.45 to about 4.3, according to the invention.

TABLE 2

Storage of "PE 0", according to the invention, at 30° C. and comparison to a fresh "PE 1"

| Storage duration of PE 0 (months) | Food A- control (PE 1) | Food B- experimental (PE 2 = 85% PE 1 + 15% PE 0) | 1rst choice | Consumption ratio % A | % B | Statistical significance | Number of validated animals |
|---|---|---|---|---|---|---|---|
| 0   | 3% PE 1 | 3.5% PE 2 | B ** | 33 | 67 | * | 26 |
| 1.5 | 3% PE 1 | 3.5% PE 2 | B ** | 38 | 62 | * | 32 |
| 3   | 3% PE 1 | 3.5% PE 2 | B ** | 27 | 73 | ** | 30 |
| 5   | 3% PE 1 | 3.5% PE 2 | B * | 19 | 81 | *** | 27 |

TABLE 3

Storage of "PE 0", according to the invention, at 40° C. and comparison to a fresh "PE 1"

| Storage duration of PE 0 (months) | Food A- control (PE 1) | Food B- experimental (PE 2 = 85% PE 1 + 15% PE 0) | 1rst choice | Consumption ratio % A | % B | Statistical significance | Number of validated animals |
|---|---|---|---|---|---|---|---|
| 0   | 3% PE 1 | 3.5% PE 2 | B ** | 33 | 67 | * | 26 |
| 1.5 | 3% PE 1 | 3.5% PE 2 | B * | 35 | 65 | * | 33 |
| 3   | 3% PE 1 | 3.5% PE 2 | B ** | 36 | 64 | ** | 32 |

B-2—Example 2—Storage of Fat/Animal Digest Composition "PE2", According to the Invention A fresh fat composition "PE 0", according to the invention, as described in Example 1 was mixed with an animal digest "PE 1" to give a fat/animal digest composition "PE 2", according to the invention, this fat/animal digest composition "PE 2" having a C12:0/C10:0 fatty acid weight ratio of 1.14 and a C14:0/C12:0 fatty acid weight ratio of 3.80.

This composition "PE 2" was stored at ambient temperature over time.

A nutritionally-balanced food composition in the form of kibbles, suitable for consumption by dogs and obtained after an extrusion and drying process, was prepared. The control foods were coated with 3% of the animal digest "PE 1" freshly prepared for each time of comparison, and the experimental foods were coated with 3.5% of the fat/animal digest composition "PE 2" stored at ambient temperature.

Here, fresh "PE 0" was mixed with fresh "PE 1" to obtain "PE 2" which was stored before preparing a food, the palatability for dog of which was then tested without having been stored.

Palatability tests were thus performed at different time points corresponding to the storage periods of "PE 2".

As shown in Table 4 below, consumption was significantly different between control and experimental foods, demonstrating the higher palatability for dog of the experimental foods containing "PE 2". The palatability results clearly showed that the palatability-enhancing effect of stored PE 2 was sustained over time: even after 6 months of storage, "PE 2" was preferred to a fresh "PE 1".

TABLE 4

Storage of "PE 2", according to the invention, at ambient temperature and comparison to a fresh "PE 1"

| Storage duration (months) of PE 2 | Food A-control (PE 1) | Food B-experimental (PE 2 = 85% PE 1 + 15% PE 0) | 1rst choice | Consumption ratio % A | % B | Statistical significance | Number of validated animals |
|---|---|---|---|---|---|---|---|
| 0 | 3% PE 1 | 3.5% PE 2 | B ** | 33 | 67 | * | 26 |
| 2.5 | 3% PE 1 | 3.5% PE 2 | B *** | 21 | 79 | *** | 33 |
| 4 | 3% PE 1 | 3.5% PE 2 | B ns | 40 | 60 | * | 30 |
| 6 | 3% PE 1 | 3.5% PE 2 | B ** | 25 | 75 | *** | 30 |

Moreover, as shown in Table 5 below, a freshly-prepared "PE 2" was not preferred to a "PE 2" stored 5 or 8 months at ambient temperature (in this case, no measure realized after 8 months of storage). Thus, the palatability-enhancing effect obtained by using "PE 2" containing the fat composition "PE 0" and an animal digest was sustained over time, demonstrating the positive effect of a fat/animal digest composition with a C12:0/C10:0 fatty acid weight ratio from about 0.85 to 2.5 and/or a C14:0/C12:0 fatty acid weight ratio from about 0.45 to about 4.3, according to the invention.

TABLE 5

Storage of "PE 2", according to the invention, at ambient temperature and comparison to a fresh "PE 2"

| Storage duration of PE 2 (months) | Food A-control (PE 2 = 85% PE 1 + 15% PE 0) | Food B-experimental (PE 2 = 85% PE 1 + 15% PE 0) | 1rst choice | Consumption ratio % A | % B | Statistical significance | Number of validated animals |
|---|---|---|---|---|---|---|---|
| 5 | 3.5% PE 2 fresh | 3.5% PE 2 stored | B ns | 38 | 62 | ns | 27 |
| 8 | 3.5% PE 2 fresh | 3.5% PE 2 stored | A ns | 55 | 45 | ns | 28 |

As shown in Tables 6 and 7 below, the same palatability-enhancing effect was obtained when "PE 2" was stored at 30° C. or at 40° C. during 2.5 months respectively, demonstrating the valuable palatability-enhancing capacities of "PE2".

TABLE 6

Storage of "PE 2", according to the invention, at 30° C. and comparison to a fresh "PE 1"

| Storage duration of PE 2 (months) | Food A-control (PE 1) | Food B-experimental (PE 2 = 85% PE 1 + 15% PE 0) | 1rst choice | Consumption ratio % A | % B | Statistical significance | Number of validated animals |
|---|---|---|---|---|---|---|---|
| 0 | 3% PE 1 | 3.5% PE 2 | B ** | 33 | 67 | * | 26 |
| 2.5 | 3% PE 1 | 3.5% PE 2 | B ** | 17 | 83 | *** | 33 |
| 4 | 3% PE 1 | 3.5% PE 2 | B * | 46 | 54 | ns | 25 |

TABLE 7

Storage of "PE 2", according to the invention, at 40° C. and comparison to a fresh "PE 1"

| Storage duration of PE 2 (months) | Food A-control (PE 1) | Food B-experimental (PE 2 = 85% PE 1 + 15% PE 0) | 1rst choice | Consumption ratio % A | % B | Statistical significance | Number of validated animals |
|---|---|---|---|---|---|---|---|
| 0 | 3% PE 1 | 3.5% PE 2 | B ** | 33 | 67 | * | 26 |
| 2.5 | 3% PE 1 | 3.5% PE 2 | B *** | 29 | 71 | *** | 29 |
| 4 | 3% PE 1 | 3.5% PE 2 | B ns | 42 | 58 | ns | 26 |

B-3—Example 3—Storage of Kibbles "PE2", According to the Invention

A fresh fat composition "PE 0", according to the invention, as described in Example 1, was mixed with an animal digest "PE 1" to give a fat/animal digest composition "PE 2", according to the invention, this fat/animal digest composition "PE 2" having a C12:0/C10:0 fatty acid weight ratio of 1.14 and a C14:0/C12:0 fatty acid weight ratio of 3.80.

A nutritionally-balanced food composition in the form of kibbles, suitable for consumption by dogs and obtained after an extrusion and drying process, was prepared. The control food was coated with 3% of the animal digest "PE 1", and the experimental food was coated with 3.5% of the fat/animal digest composition "PE 2". Both control and experimental foods were stored at ambient temperature over time.

Here, fresh "PE 0" was mixed with fresh "PE 1" to obtain a fresh "PE 2" which was used to prepare a food, the palatability for dog of which was then tested after storage over time.

Palatability tests were performed at different time points corresponding to the storage periods of the food.

As shown in Table 8 below, consumption was significantly different between control and experimental foods, demonstrating the higher palatability for dog of the experimental foods coated with "PE 2" containing the fat composition "PE 0". The palatability results clearly showed that the addition of the fat composition "PE 0" strongly enhanced the palatability of the animal digest "PE 1", and that the palatability-enhancing effect of "PE 0" and "PE 2" was sustained over 3 months of storage of the foods. Those results demonstrated the positive effect of fat compositions with a C12:0/C10:0 fatty acid weight ratio from about 0.85 to 2.5 and/or a C14:0/C12:0 fatty acid weight ratio from about 0.45 to about 4.3, according to the invention.

B-4—Example 4: Storage of Fat Composition "PE 00", According to the Invention A fat composition, according to the invention, designated below as "PE 00", was prepared by enzymatic hydrolysis, this fat composition having a C12:0/C10:0 fatty acid weight ratio of 1.07 and a C14:0/C12:0 fatty acid weight ratio of 3.09.

This fat composition "PE 00" was stored at ambient temperature over time.

At different time points during the storage of "PE 00", a fat/animal digest composition "PE 12", according to the invention, was prepared by mixing a fresh animal digest "PE 11" with stored "PE 00" (PE 12=85% PE 11+15% PE 00), this fat/animal digest composition "PE 12" having a C12:0/C10:0 fatty acid weight ratio of 1.07 and a C14:0/C12:0 fatty acid weight ratio of 3.62.

The digest "PE 11" is a liquid palatability enhancer of high palatability, containing poultry liver hydrolysate.

Fresh "PE 12" was then used to prepare a food for pet as follows.

A nutritionally-balanced food composition in the form of kibbles, suitable for consumption by dogs and obtained after an extrusion and drying process, was prepared. The control foods were coated with 3% of the animal digest "PE 11" and the experimental foods were coated with 3.5% of the fat/animal digest composition "PE 12".

So, here, "PE 00" was stored and samples thereof were taken and mixed at each time point with a fresh "PE 11" to obtain "PE 12" which was used fresh to prepare a food, the palatability for dog of which was then tested without having been stored.

Palatability tests were thus performed at different time points corresponding to the storage periods of "PE 00".

TABLE 8

Storage of kibbles "PE2", according to the invention, at ambient temperature

| Storage duration of control & experimental kibbles (months) | Food A-control (PE 1) | Food B-experimental (PE 2 = 85% PE 1 + 15% PE 0) | 1rst choice | Consumption ratio % A | % B | Statistical significance | Number of validated animals |
|---|---|---|---|---|---|---|---|
| 0.5 | 3% PE 1 | 3.5% PE 2 | B *** | 12 | 88 | *** | 30 |
| 1 | 3% PE 1 | 3.5% PE 2 | B *** | 21 | 79 | *** | 36 |
| 1.5 | 3% PE 1 | 3.5% PE 2 | B *** | 22 | 78 | *** | 32 |
| 2.5 | 3% PE 1 | 3.5% PE 2 | B *** | 24 | 76 | *** | 31 |
| 3 | 3% PE 1 | 3.5% PE 2 | B ** | 23 | 77 | *** | 32 |

As shown in Table 9 below, consumption was significantly different between control and experimental foods, demonstrating the higher palatability for dog of the experimental foods containing the fat composition "PE 00". The palatability results clearly showed that the addition of stored "PE 00" strongly enhanced palatability of the animal digest "PE 11", even when "PE 00" was stored during 12 months at ambient temperature.

TABLE 9

Storage of "PE 00", according to the invention, at ambient temperature and comparison to a fresh "PE 11"

| Storage duration of PE 00 (months) | Food A- control (PE 11) | Food B- experimental (PE 12 = 85% PE 11 + 15% PE 00) | 1rst choice | Consumption ratio % A | % B | Statistical significance | Number of validated animals |
|---|---|---|---|---|---|---|---|
| 0   | 3% PE 11 | 3.5% PE 12 | B *** | 19 | 81 | *** | 25 |
| 1.5 | 3% PE 11 | 3.5% PE 12 | B **  | 25 | 75 | *** | 35 |
| 3   | 3% PE 11 | 3.5% PE 12 | B *** | 15 | 85 | *** | 34 |
| 6   | 3% PE 11 | 3.5% PE 12 | B *   | 21 | 79 | *** | 27 |
| 8   | 3% PE 11 | 3.5% PE 12 | B **  | 15 | 85 | *** | 34 |
| 12  | 3% PE 11 | 3.5% PE 12 | B *   | 29 | 71 | *** | 32 |

As shown in Table 10 below, the same palatability-enhancing effect was obtained when the fat composition "PE 00" was stored at 40° C. during 6 months (no measure realized after 6 months of storage). Thus, a sustained palatability-enhancing effect was generally obtained using the fat composition "PE 00", demonstrating the positive effect of a fat composition with a C12:0/C10:0 fatty acid weight ratio from about 0.85 to 2.5 and/or a C14:0/C12:0 fatty acid weight ratio from about 0.45 to about 4.3, according to the invention.

TABLE 10

Storage of "PE 00", according to the invention, at 40° C. and comparison to a fresh "PE 11"

| Storage duration of PE 00 (months) | Food A- control (PE 11) | Food B- experimental (PE 12 = 85% PE 11 + 15% PE 00) | 1rst choice | Consumption ratio % A | % B | Statistical significance | Number of validated animals |
|---|---|---|---|---|---|---|---|
| 0 | 3% PE 11 | 3.5% PE 12 | B*** | 19 | 81 | *** | 25 |
| 3 | 3% PE 11 | 3.5% PE12  | B**  | 23 | 77 | *** | 29 |
| 6 | 3% PE 11 | 3.5% PE12  | B*   | 27 | 73 | *** | 32 |

B-5—Example 5—Storage of Fat/Animal Digest Composition "PE 12", According to the Invention A fresh fat composition "PE 00", according to the invention, as described in Example 4, was mixed with an animal digest "PE 11" to give a fat/animal digest composition "PE 12", according to the invention, this fat/animal digest composition "PE 12" having a C12:0/C10:0 fatty acid weight ratio of 1.07 and a C14:0/C12:0 fatty acid weight ratio of 3.62

This composition "PE 12" was stored at ambient temperature over time.

A nutritionally-balanced food composition in the form of kibbles, suitable for consumption by dogs and obtained after an extrusion and drying process, was prepared. The control foods were coated with 3% of the animal digest "PE 11" freshly prepared for each time of comparison, and the experimental foods were coated with 3.5% of the fat/animal digest composition "PE 12" stored at ambient temperature.

Here, fresh "PE 00" was mixed with fresh "PE 11" to obtain "PE 12" which was stored before preparing a food, the palatability for dog of which was then tested without having been stored.

Palatability tests were thus performed at different time points corresponding to the storage periods of "PE 12".

As shown in Table 11 below, consumption was significantly different between control and experimental foods, demonstrating the higher palatability for dog of the experimental foods containing stored "PE 12". The palatability results clearly showed that the palatability-enhancing effect of "PE 12" was sustained over time and that after 6 months of storage at ambient temperature, "PE 12" was still statistically preferred to fresh "PE 11". This demonstrated the positive effect of a fat/animal digest composition with a C12:0/C10:0 fatty acid weight ratio from about 0.85 to 2.5 and/or a C14:0/C12:0 fatty acid weight ratio from about 0.45 to about 4.3, according to the invention.

TABLE 11

Storage of "PE 12", according to the invention, at ambient temperature and comparison to a fresh "PE11"

| Storage duration of PE 12 (months) | Food A- control (PE 11) | Food B- experimental (PE 12 = 85% PE 11 + 15% PE 00) | 1rst choice | Consumption ratio % A | % B | Statistical significance | Number of validated animals |
|---|---|---|---|---|---|---|---|
| 0 | 3% PE 11 | 3.5% PE 12 | B *** | 19 | 81 | *** | 27 |
| 2.5 | 3% PE 11 | 3.5% PE 12 | B * | 36 | 64 | ** | 27 |
| 4 | 3% PE 11 | 3.5% PE 12 | B ns | 38 | 62 | * | 29 |
| 6 | 3% PE 11 | 3.5% PE 12 | B ns | 40 | 60 | * | 34 |

B-6—Example 6—Storage of Kibbles "PE12 Bis", According to the Invention

Another batch of a fresh fat composition, according to the invention, was prepared as described in Example 4, in connection with "PE 00". This new batch, designated below as "PE00bis", has a C12:0/C10:0 fatty acid weight ratio of 1.11 and a C14:0/C12:0 fatty acid weight ratio of 3.19.

"PE 00bis" was mixed with an animal digest "PE 11" to give a fat/animal digest composition "PE 12bis" (PE 12bis=85% PE 11+15% PE 00bis), this fat/animal digest composition "PE 12bis" having a C12:0/C10:0 fatty acid weight ratio of 1.11 and a C14:0/C12:0 fatty acid weight ratio of 3.74.

A nutritionally-balanced food composition in the form of kibbles, suitable for consumption by dogs and obtained after an extrusion and drying process, was prepared. The control food was coated with 3% of the animal digest "PE 11", and the experimental food was coated with 3.5% of the fat/animal digest composition "PE 12bis". Both control and experimental foods were stored at ambient temperature over time.

Here, fresh "PE 00bis" was mixed with fresh "PE 11" to obtain a fresh "PE 12bis" which was used to prepare a food, the palatability for dog of which was then tested after storage over time.

Palatability tests were performed at different time points corresponding to the storage periods of the food.

As shown in Table 12 below, consumption was significantly different between control and experimental foods, demonstrating the higher palatability for dog of the experimental foods coated with "PE 12bis" containing the fat composition "PE 00bis". The palatability results clearly showed that the addition of the fat composition "PE 00bis" strongly enhanced the palatability of the animal digest "PE 11", and that the palatability-enhancing effect was sustained over 15 months of storage of the foods. This demonstrated the positive effect of a fat/animal digest composition with a C12:0/C10:0 fatty acid weight ratio from about 0.85 to 2.5 and/or a C14:0/C12:0 fatty acid weight ratio from about 0.45 to about 4.3, according to the invention.

TABLE 12

Storage of kibbles "PE 12 bis", according to the invention at ambient temperature

| Storage duration of control & experimental kibbles (months) | Food A- control (PE 11) | Food B- experimental (PE 12 bis = 85% PE 11 + 15% PE 00 bis) | 1rst choice | Consumption ratio % A | % B | Statistical significance | Number of validated animals |
|---|---|---|---|---|---|---|---|
| 0.25 | 3% PE 11 | 3.5% PE 12bis | B ** | 24 | 76 | *** | 34 |
| 0.5 | 3% PE 11 | 3.5% PE 12bis | B ** | 23 | 77 | *** | 31 |
| 1 | 3% PE 11 | 3.5% PE 12bis | B * | 18 | 82 | *** | 33 |
| 2 | 3% PE 11 | 3.5% PE 12bis | B *** | 23 | 77 | *** | 31 |
| 4 | 3% PE 11 | 3.5% PE 12bis | B *** | 32 | 68 | ** | 35 |
| 6 | 3% PE 11 | 3.5% PE 12bis | B * | 29 | 71 | *** | 33 |
| 8 | 3% PE 11 | 3.5% PE 12bis | B * | 32 | 68 | ** | 37 |
| 10 | 3% PE 11 | 3.5% PE 12bis | B ns | 36 | 64 | ** | 28 |
| 12 | 3% PE 11 | 3.5% PE 12bis | B * | 33 | 67 | ** | 35 |
| 15 | 3% PE 11 | 3.5% PE 12bis | B ns | 35 | 65 | ** | 35 |

B-7—Comparative Example 7—Storage of Kibbles "PE22", PE 22 Having C12:0/C10:0 and/or C14:0/C12:0 Fatty Acid Weight Ratio Outside from the Range Ratio According to the Invention A fat composition, designated below as "PE 20", having C12:0/C10:0 and/or C14:0/C12:0 fatty acid weight ratio outside from the range ratio according to the invention, was prepared by enzymatic hydrolysis, this fat composition having a C12:0/C10:0 fatty acid weight ratio of 0 and a C14:0/C12:0 fatty acid weight ratio of 11.

This fat composition "PE 20" was mixed with an animal digest "PE 11" to give a fat/animal digest composition "PE 22" (PE 22=85% PE 11+15% PE 20), this fat/animal digest composition "PE 22" having a C12:0/C10:0 fatty acid weight ratio of 0 and a C14:0/C12:0 fatty acid weight ratio of 28.

A nutritionally-balanced food composition in the form of kibbles, suitable for consumption by dogs and obtained after an extrusion and drying process, was prepared. The control food was coated with 3% of the animal digest "PE 11", and the experimental food was coated with 3.5% of the fat/animal digest composition "PE 22". Both control and experimental foods were stored at ambient temperature over time.

Here, fresh "PE 20" was mixed with fresh "PE 11" to obtain a fresh "PE 22" which was used to prepare a food, the palatability for dog of which was then tested after storage over time.

Palatability tests were performed at different time points corresponding to the storage periods of the food.

As shown in Table 13 below, consumption was significantly different between control and experimental foods, demonstrating the higher palatability for dog of the experimental foods coated with "PE 22" containing the fat composition "PE 20". However, the difference was not statistically different after 6 months of storage, suggesting that the palatability-enhancing effect of "PE 20" and "PE 22" decreased over time. This decrease over time was not observed with kibbles coated with "PE 12bis" containing the fat composition "PE 00bis" (see Example 6 above and Graph 3 below), those kibbles having a sustained palatability over 15 months. This demonstrated that fat compositions having a C12:0/C10:0 and/or a C14:0/C12:0 fatty acid weight ratio outside from the range ratio according to the invention did not allow an enhanced and sustained palatability.

TABLE 13

Storage of kibbles "PE 22" at ambient temperature, "PE 22" having a C12:0/C10:0 and/or C14:0/C12:0 fatty acid weight ratio outside from the range ratio according to the invention

| Storage duration of control & experimental kibbles (months) | Food A- control (PE 11) | Food B- experimental (PE 22 = 85% PE 11 + 1rst 15% PE 20) choice | Consumption ratio | | Statistical significance | Number of validated animals |
|---|---|---|---|---|---|---|
| | | | % A | % B | | |
| 0.25 | 3% PE 11 | 3.5% PE 22 B * | 18 | 82 | *** | 33 |
| 0.5 | 3% PE 11 | 3.5% PE 22 B *** | 23 | 77 | *** | 33 |
| 1 | 3% PE 11 | 3.5% PE 22 B * | 21 | 79 | *** | 28 |
| 2 | 3% PE 11 | 3.5% PE 22 B NS | 37 | 63 | * | 35 |
| 4 | 3% PE 11 | 3.5% PE 22 B NS | 39 | 61 | * | 34 |
| 6 | 3% PE 11 | 3.5% PE 22 B NS | 34 | 66 | ** | 30 |
| 8 | 3% PE 11 | 3.5% PE 22 B * | 40 | 60 | NS | 31 |
| 10 | 3% PE 11 | 3.5% PE 22 B NS | 50 | 50 | NS | 36 |
| 12 | 3% PE 11 | 3.5% PE 22 B NS | 39 | 61 | NS | 34 |
| 15 | 3% PE 11 | 3.5% PE 22 B NS | 49 | 51 | NS | 31 |

B-8—Comparative Example 8—Storage of Kibbles "PE 32" PE 32 Having a C12:0/C10:0 and/or C14:0/C12:0 Fatty Acid Weight Ratio Outside from the Range Ratio According to the Invention A fat composition, designated below as "PE 30", having a C12:0/C10:0 and/or C14:0/C12:0 fatty acid weight ratio outside from the range ratio according to the invention, was prepared by enzymatic hydrolysis, this fat composition having a C12:0/C10:0 fatty acid weight ratio of 0 and a C14:0/C12:0 fatty acid weight ratio of 37.

This fat composition "PE 30" was mixed with an animal digest "PE 11" to give a fat/animal digest composition "PE 32" (PE 32=85% PE 11+15% PE 30), this fat/animal digest composition "PE 32" having a C12:0/C10:0 fatty acid weight ratio of 0 and a C14:0/C12:0 fatty acid weight ratio of 54, outside from the range ratio according to the invention.

A nutritionally-balanced food composition in the form of kibbles, suitable for consumption by dogs and obtained after an extrusion and drying process, was prepared. The control food was coated with 3% of the animal digest "PE 11", and the experimental food was coated with 3.5% of the fat/animal digest composition "PE 32". Both control and experimental foods were stored at ambient temperature over time.

Here, fresh "PE 30" was mixed with fresh "PE 11" to obtain a fresh "PE 32" which was used to prepare a food, the palatability for dog of which was then tested after storage over time.

Palatability tests were performed at different time points corresponding to the storage periods of the food.

As shown in Table 14 below, consumption was either not significantly different between control and experimental foods, or favorable to the control food. This showed that palatability enhancement was not obtained with the fat/animal digest composition "PE 32" containing the fat composition "PE 30". That result was not observed with kibbles coated with "PE 12bis" containing the fat composition "PE 00bis" (see Example 6 above and Graph 3 below), demonstrating the better palatability-enhancing capacities of "PE 00bis" compared to "PE 30". This demonstrated that fat compositions having a C12:0/C10:0 and/or a C14:0/C12:0 fatty acid weight ratio outside from the range ratio according to the invention did not allow an enhanced and sustained palatability.

TABLE 14

Storage of kibbles "PE 32" at ambient temperature, "PE 32" having a C12:0/C10:0 and/or C14:0/C12:0 fatty acid weight ratio outside from the range ratio according to the invention:

| Storage duration of control & experimental kibbles (months) | Food A- control (PE 11) | Food B- experimental (PE 32 = 85% PE 11 + 1rst 15% PE 30) choice | | % A | % B | Statistical significance | Number of validated animals |
|---|---|---|---|---|---|---|---|
| 0.25 | 3% PE 11 | 3.5% PE 32 | A NS | 52 | 48 | NS | 30 |
| 0.5 | 3% PE 11 | 3.5% PE 32 | A NS | 66 | 35 | * | 28 |
| 1 | 3% PE 11 | 3.5% PE 32 | A NS | 57 | 43 | NS | 27 |
| 2 | 3% PE 11 | 3.5% PE 32 | A NS | 56 | 44 | NS | 32 |
| 4 | 3% PE 11 | 3.5% PE 32 | A NS | 59 | 41 | NS | 36 |
| 6 | 3% PE 11 | 3.5% PE 32 | A NS | 59 | 41 | NS | 35 |
| 8 | 3% PE 11 | 3.5% PE 32 | A NS | 61 | 39 | * | 38 |
| 10 | 3% PE 11 | 3.5% PE 32 | A NS | 63 | 37 | * | 32 |
| 12 | 3% PE 11 | 3.5% PE 32 | B NS | 51 | 49 | NS | 32 |
| 15 | 3% PE 11 | 3.5% PE 32 | A * | 55 | 45 | NS | 34 |

B-9—Comparative Example 9—Storage of Fat Composition "PE 20", PE 20 Having a C12:0/C10:0 and/or C14:0/C12:0 Fatty Acid Weight Ratio Outside from the Range Ratio According to the Invention A fat composition, designated below as "PE 20", PE 20 having a C12:0/C10:0 and/or C14:0/C12:0 fatty acid weight ratio outside from the range ratio according to the invention, was prepared by enzymatic hydrolysis, this fat composition having a C12:0/C10:0 fatty acid weight ratio of 0 and a C14:0/C12:0 fatty acid weight ratio of 11.

This fat composition "PE 20" was stored at ambient temperature over time.

At different time points during the storage of "PE 20", a fat/animal digest composition "PE 22" was prepared by mixing a fresh animal digest "PE 11" with stored "PE 20" ("PE 22"=85% "PE 11"+15% "PE 20"), this fat/animal digest composition "PE 22" having a C12:0/C10:0 fatty acid weight ratio of 0 and a C14:0/C12:0 fatty acid weight ratio of 28, ratio being outside from the range ratio according to the invention.

Fresh "PE 22" was then used to prepare a food for pet as follows.

A nutritionally-balanced food composition in the form of kibbles, suitable for consumption by dogs and obtained after an extrusion and drying process, was prepared. The control foods were coated with 3% of the animal digest "PE 11" and the experimental foods were coated with 3.5% of the fat/ animal digest composition "PE 22".

So, here, "PE 20" was stored and samples thereof were taken and mixed at each time point with a fresh "PE 11" to obtain "PE 22" which was used fresh to prepare a food, the palatability for dog of which was then tested without having been stored.

Palatability tests were thus performed at different time points corresponding to the storage periods of "PE 20".

As shown in Table 15 below, consumption was significantly different between control and experimental foods until 6 months, but not after 8 or 12 months. of storage, suggesting that the palatability-enhancing effect of "PE 22" containing the stored fat composition "PE 20" decreased over time. This decreased over time was not observed with "PE12 bis" containing the fat composition "PE00" (see example 4 above or Graph 1 below). This demonstrated that fat compositions having a C12:0/C10:0 and/or a C14:0/C12:0 fatty acid weight ratio outside from the range ratio according to the invention did not allow an enhanced and sustained palatability.

TABLE 15

Storage of "PE 20" at ambient temperature, "PE 20" having a C12:0/C10:0 and/or C14:0/C12:0 fatty acid weight ratio outside from the range ratio according to the invention,: and comparison to a fresh "PE11"

| Storage duration of PE 20 (months) | Food A- control (PE 11) | Food B- experimental (PE 22 = 85% PE 11 + 15% PE 20) choice | | % A | % B | Statistical significance | Number of validated animals |
|---|---|---|---|---|---|---|---|
| 0 | 3% PE 11 | 3.5% PE 22 | B * | 21 | 79 | *** | 28 |
| 1.5 | 3% PE 11 | 3.5% PE 22 | B NS | 52 | 48 | NS | 36 |

TABLE 15-continued

Storage of "PE 20" at ambient temperature, "PE 20" having a
C12:0/C10:0 and/or C14:0/C12:0 fatty acid weight ratio outside from the range
ratio according to the invention,; and comparison to a fresh "PE11"

| Storage duration of PE 20 (months) | Food A- control (PE 11) | Food B- experimental (PE 22 = 85% PE 11 + 15% PE 20) | 1rst choice | % A | % B | Statistical significance | Number of validated animals |
|---|---|---|---|---|---|---|---|
| 3 | 3% PE 11 | 3.5% PE 22 | B * | 25 | 75 | *** | 34 |
| 6 | 3% PE 11 | 3.5% PE 22 | B NS | 38 | 62 | * | 32 |
| 8 | 3% PE 11 | 3.5% PE 22 | B NS | 41 | 59 | NS | 36 |
| 12 | 3% PE 11 | 3.5% PE 22 | B NS | 50 | 50 | NS | 33 |

B-10—Comparative Example 10—Storage of Fat/Animal Digest Composition "PE 22", "PE 22" Having a C12:0/C10:0 and/or C14:0/C12:0 Fatty Acid Weight Ratio Outside from the Range Ratio According to the Invention A fresh fat composition "PE 20", "PE 20" having a C12:0/C10:0 and/or C14:0/C12:0 fatty acid weight ratio outside from the range ratio according to the invention, as described in Example 9, was mixed with an animal digest "PE 11" to give a fat/animal digest composition "PE 22", this fat/animal digest composition "PE 22" having a C12:0/C10:0 fatty acid weight ratio of 0 and a C14:0/C12:0 fatty acid weight ratio of 28, ratio being outside from the range ratio according to the invention.

This composition "PE 22" was stored at ambient temperature over time.

A nutritionally-balanced food composition in the form of kibbles, suitable for consumption by dogs and obtained after an extrusion and drying process, was prepared. The control foods were coated with 3% of the animal digest "PE 11" freshly prepared for each time of comparison, and the experimental foods were coated with 3.5% of the fat/animal digest composition "PE 22" stored at ambient temperature.

Here, fresh "PE 20" was mixed with fresh "PE 11" to obtain "PE 22" which was stored before preparing a food, the palatability for dog of which was then tested without having been stored.

Palatability tests were thus performed at different time points corresponding to the storage periods of "PE 22".

As shown in Table 16 below, consumption was significantly favorable to experimental foods only until 1.5 months. After 3 months of storage of "PE 22", the difference was not statistically different between the foods, suggesting that the palatability-enhancing effect of stored "PE 22" decreased over time. This decrease over time was not observed in such a way with "PE 12bis" containing the fat composition "PE 00bis" (see Example 5 above and Graph 2 below). This demonstrated that fat compositions having a C12:0/C10:0 and/or a C14:0/C12:0 fatty acid weight ratio outside from the range ratio according to the invention did not allow an enhanced and sustained palatability.

TABLE 16

Storage of "PE 22" at ambient temperature, "PE 22" having a
C12:0/C10:0 and/or C14:0/C12:0 fatty acid weight ratio outside from the range
ratio according to the invention, and comparison to a fresh "PE 11"

| Storage duration of PE 22 (months) | Food A- control (PE 11) | Food B- experimental (PE 22 = 85% PE 11 + 15% PE 20) | 1rst choice | % A | % B | Statistical significance | Number of validated animals |
|---|---|---|---|---|---|---|---|
| 0 | 3% PE 11 | 3.5% PE 22 | B * | 21 | 79 | *** | 28 |
| 1.5 | 3% PE 11 | 3.5% PE 22 | B ns | 39 | 61 | * | 37 |
| 3 | 3% PE 11 | 3.5% PE 22 | B * | 43 | 57 | ns | 36 |
| 6 | 3% PE 11 | 3.5% PE 22 | B ns | 51 | 49 | ns | 32 |

B-11—Comparative Example 11—Storage of Fat Composition "PE 30", "PE 30" Having a C12:0/C10:0 and/or C14:0/C12:0 Fatty Acid Weight Ratio Outside from the Range Ratio According to the Invention A fat composition, designated below as "PE 30", "PE 30" having a C12:0/C10:0 and/or C14:0/C12:0 fatty acid weight ratio outside from the range ratio according to the invention, was prepared by enzymatic hydrolysis, this fat composition having a C12:0/C10:0 fatty acid weight ratio of 0 and a C14:0/C12:0 fatty acid weight ratio of 37.

This fat composition "PE 30" was mixed with an animal digest "PE 11" to give a fat/animal digest composition "PE 32" (PE 32=85% PE 11+15% PE 30), this fat/animal digest composition "PE 32" having a C12:0/C10:0 fatty acid weight ratio of 0 and a C14:0/C12:0 fatty acid weight ratio of 54, ratio being outside from the range ratio according to the invention.

A nutritionally-balanced food composition in the form of kibbles, suitable for consumption by dogs and obtained after an extrusion and drying process, was prepared. The control food was coated with 3% of the animal digest "PE 11", and the experimental food was coated with 3.5% of the fat/animal digest composition "PE 32". Both control and experimental foods were stored at ambient temperature over time.

So, here, "PE 30" was stored and samples thereof were taken and mixed at each time point with a fresh "PE 11" to obtain "PE 32" which was used fresh to prepare a food, the palatability for dog of which was then tested without having been stored.

Palatability tests were performed at different time points corresponding to the storage periods of "PE 30".

As shown in Table 17 below, consumption was either not significantly different between control and experimental foods, or favorable to the control food. This showed that palatability enhancement was not obtained with "PE 32" containing the stored fat composition "PE 30". That result was not observed with kibbles coated with "PE 12bis" containing the stored fat composition "PE 00bis" (see Example 4 above and Graph 1 below), demonstrating the better palatability-enhancing capacities of "PE 00bis" compared to "PE 30". This clearly showed that fat compositions having a C12:0/C10:0 and/or a C14:0/C12:0 fatty acid weight ratio outside from the range ratio according to the invention did not allow an enhanced and sustained palatability.

TABLE 17

Storage of "PE 30", "PE 30" having a C12:0/C10:0 and/or C14:0/C12:0 fatty acid weight ratio outside from the range ratio according to the invention, at ambient temperature and comparison to a fresh "PE11"

| Storage duration of PE 30 (months) | Food A- control (PE 11) | Food B- experimental (PE 32 = 85% PE 11 + 15% PE 30) | 1rst choice | % A | % B | Statistical significance | Number of validated animals |
|---|---|---|---|---|---|---|---|
| 0 | 3% PE 11 | 3.5% PE 32 | B NS | 57 | 43 | NS | 27 |
| 1.5 | 3% PE 11 | 3.5% PE 32 | B NS | 50 | 50 | NS | 25 |
| 3 | 3% PE 11 | 3.5% PE 32 | B NS | 49 | 51 | NS | 35 |
| 6 | 3% PE 11 | 3.5% PE 32 | B NS | 61 | 39 | * | 35 |
| 8 | 3% PE 11 | 3.5% PE 32 | B NS | 54 | 46 | NS | 28 |
| 12 | 3% PE 11 | 3.5% PE 32 | B NS | 67 | 33 | ** | 36 |

B-12—Comparative Example 12—Storage of Fat/Animal Digest Composition "PE 32", "PE 32" Having a C12:0/C10:0 and/or C14:0/C12:0 Fatty Acid Weight Ratio Outside from the Range Ratio According to the Invention A fresh fat composition "PE 30", "PE 30" having a C12:0/C10:0 and/or C14:0/C12:0 fatty acid weight ratio outside from the range ratio according to the invention, as described in Example 11, was mixed with an animal digest "PE 11" to give a fat/animal digest composition "PE 32", this fat/animal digest composition "PE 32" having a C12:0/C10:0 fatty acid weight ratio of 0 and a C14:0/C12:0 fatty acid weight ratio of 54, PE 32 having a C12:0/C10:0 or C14:0/C12:0 fatty acid weight ratio outside from the range ratio according to the invention.

This composition "PE 32" was stored at ambient temperature over time.

A nutritionally-balanced food composition in the form of kibbles, suitable for consumption by dogs and obtained after an extrusion and drying process, was prepared. The control foods were coated with 3% of the animal digest "PE 11" freshly prepared for each time of comparison, and the experimental foods were coated with 3.5% of the fat/animal digest composition "PE 32" stored at ambient temperature.

Here, fresh "PE 30" was mixed with fresh "PE 11" to obtain "PE 32" which was stored before preparing a food, the palatability for dog of which was then tested without having been stored.

Palatability tests were thus performed at different time points corresponding to the storage periods of "PE 32".

As shown in Table 18 below, consumption was either not significantly different between control and experimental foods, or favorable to the control food. This showed that palatability enhancement was not obtained with the stored fat/animal digest composition "PE 32" containing the fat composition "PE 30", and that after 6 months the results were even better for control food. That result was not observed with "PE 12bis" containing the fat composition "PE 00bis" (see Example 5 above and Graph 2 below). This demonstrated that fat compositions having a C12:0/C10:0 and/or a C14:0/C12:0 fatty acid weight ratio outside from the range ratio according to the invention did not allow an enhanced and sustained palatability.

TABLE 18

Storage of "PE 32", "PE 32" having a C12:0/C10:0 and/or C14:0/C12:0 fatty acid weight ratio outside from the range ratio according to the invention, at ambient temperature and comparison to a fresh "PE 11"

| Storage duration of PE 32 (months) | Food A- control (PE 11) | Food B- experimental (PE 32 = 85% PE 11 + 15% PE 30) | 1rst choice | Consumption ratio | | Statistical significance | Number of validated animals |
|---|---|---|---|---|---|---|---|
| | | | | % A | % B | | |
| 0 | 3% PE 11 | 3.5% PE 32 | B NS | 57 | 43 | NS | 27 |
| 1.5 | 3% PE 11 | 3.5% PE 32 | B *** | 41 | 59 | NS | 33 |
| 3 | 3% PE 11 | 3.5% PE 32 | B NS | 59 | 41 | NS | 28 |
| 6 | 3% PE 11 | 3.5% PE 32 | B NS | 65 | 35 | * | 38 |

B-13—Comparative Example 13—Storage of Kibbles "PE 42", "PE 42" Having a C12:0/C10:0 and/or C14:0/C12:0 Fatty Acid Weight Ratio Outside from the Range Ratio According to the Invention A fat composition, designated below as "PE 40", "PE 40" having a C12:0/C10:0 and/or C14:0/C12:0 fatty acid weight ratio outside from the range ratio according to the invention, was prepared by enzymatic hydrolysis, this fat composition having a C12:0/C10:0 fatty acid weight ratio of 0 and a C14:0/C12:0 fatty acid weight ratio of 5.

This fat composition "PE 40" was mixed with an animal digest "PE 11" to give a fat/animal digest composition "PE 42" (PE 42=85% PE 11+15% PE 40), this fat/animal digest composition "PE 42" having a C12:0/C10:0 fatty acid weight ratio of 0 and a C14:0/C12:0 fatty acid weight ratio of 13.5, ratio being outside from the range ratio according to the invention.

A nutritionally-balanced food composition in the form of kibbles, suitable for consumption by dogs and obtained after an extrusion and drying process, was prepared. The control food was coated with 3% of the animal digest "PE 11", and the experimental food was coated with 3.5% of the fat/animal digest composition "PE 42". Both control and experimental foods were stored at ambient temperature over time.

Here, fresh "PE 40" was mixed with fresh "PE 11" to obtain a fresh "PE 42" which was used to prepare a food, the palatability for dog of which was then tested after storage over time.

Palatability tests were performed at different time points corresponding to the storage periods of the food.

As shown in Table 19 below, consumption was not significantly different between control and experimental foods, suggesting that palatability enhancement was not obtained with the fat/animal digest composition "PE 42" containing the fat composition "PE 40". That result was not observed with kibbles coated with "PE 12bis" containing the fat composition "PE 00bis" (see Example 6 above and Graph 3 below), demonstrating the better palatability-enhancing capacities of "PE 00bis" compared to "PE 40". This demonstrated that fat compositions having a C12:0/C10:0 and/or a C14:0/C12:0 fatty acid weight ratio outside from the range ratio according to the invention did not allow an enhanced and sustained palatability.

TABLE 19

Storage of kibbles "PE 42" at ambient temperature, "PE 42" a C12:0/C10:0 and/or C14:0/C12:0 fatty acid weight ratio outside from the range ratio according to the invention and comparison to kibbles "PE 11" stored at ambient temperature.

| Storage duration of control & experimental kibbles (months) | Food A- control (PE 11) | Food B- experimental (PE 42 = 85% PE 11 + 15% PE 40) | 1rst choice | Consumption ratio | | Statistical significance | Number of validated animals |
|---|---|---|---|---|---|---|---|
| | | | | % A | % B | | |
| 0.25 | 3% PE 11 | 3.5% PE 42 | B NS | 60 | 40 | NS | 36 |
| 0.5 | 3% PE 11 | 3.5% PE 42 | A NS | 41 | 59 | NS | 36 |
| 1 | 3% PE 11 | 3.5% PE 42 | A NS | 63 | 37 | NS | 36 |
| 2 | 3% PE 11 | 3.5% PE 42 | A NS | 49 | 51 | NS | 35 |
| 4 | 3% PE 11 | 3.5% PE 42 | A NS | 57 | 43 | NS | 35 |

B-14—Graphical Comparison of Results from Examples 4/9/11-5/10/12-6/7/8

As detailed in examples 4, 9 and 11, fat compositions "PE 00", "PE 20" and "PE 30" respectively, were stored at ambient temperature over time and their palatability were assessed, compared to a control.

As shown by the Graph 1, the fat composition "PE 00", having a C12:0/C10:0 fatty acid weight ratio of 1.07 and a C14:0/C12:0 ratio of 3.09, ratio being in the range ratio according to the invention (C12:0/C10:0 fatty acid weight ratio from about 0.85 to about 2.5 and/or a C14:0/C12:0 fatty acid weight ratio from about 0.45 to about 4.3), presented an enhanced and sustained palatability.

This result was not observed with "PE 20" or "PE 30", those fat compositions having a C12:0/C10:0 and/or a C14:0/C12:0 fatty acid weight ratio outside from the range ratio according to the invention.

As detailed in examples 5, 10 and 12, fat/animal digest compositions "PE 12", "PE 22" and "PE 32" respectively, were stored at ambient temperature over time and their palatability were assessed, compared to a control.

As shown by the Graph 2, the fat/animal digest composition "PE 12", having a C12:0/C10:0 fatty acid weight ratio of 1.07 and a C14:0/C12:0 ratio of 3.62, ratio being in the range ratio according to the invention (C12:0/C10:0 fatty acid weight ratio from about 0.85 to about 2.5 and/or a C14:0/C12:0 fatty acid weight ratio from about 0.45 to about 4.3), presented an enhanced and sustained palatability.

This result was not observed with "PE 22" or "PE 32", those fat/animal digest compositions having a C12:0/C10:0 and/or a C14:0/C12:0 fatty acid weight ratio outside from the range ratio according to the invention.

As detailed in examples 6, 7 and 8, kibbles coated with fat/animal digest compositions "PE 12bis", "PE 22" and "PE 32" respectively, were stored at ambient temperature over time and their palatability were assessed, compared to a control.

As shown by the Graph 3, the kibbles "PE 12 bis", with "PE 12 bis" having a C12:0/C10:0 fatty acid weight ratio of 1.11 and a C14:0/C12:0 ratio of 3.74, ratio being in the range ratio according to the invention (C12:0/C10:0 fatty acid weight ratio from about 0.85 to about 2.5 and/or a C14:0/C12:0 fatty acid weight ratio from about 0.45 to about 4.3), presented an enhanced and sustained palatability until 15 months of storage.

This result was not observed with kibbles "PE 22" or "PE 32", those kibbles being coated with fat/animal digest compositions having a C12:0/C10:0 and/or a C14:0/C12:0 fatty acid weight ratio outside from the range ratio according to the invention.

The results obtained clearly showed that fat compositions, having a C12:0/C10:0 fatty acid weight ratio from about 0.85 to about 2.5 and/or a C14:0/C12:0 fatty acid weight ratio from about 0.45 to about 4.3, applied to pet food diets, presented an enhanced and sustained palatability.

B-15—Comparative Example 15—Storage of Fat/Animal Digest Composition "PE 52" According to the Invention Compared to Storage of "PE 62" Having a C12:0/C10:0 and/or C14:0/C12:0 Fatty Acid Weight Ratio Outside from the Range Ratio According to the Invention A fat/animal digest composition, according to the invention, designated below as "PE 52", was prepared by enzymatic hydrolysis, this fat/animal digest composition having a C12:0/C10:0 fatty acid weight ratio of 1.7 and a C14:0/C12:0 fatty acid weight ratio of 3.9.

Another fat/animal digest composition, designated below as "PE 62", having C12:0/C10:0 and/or C14:0/C12:0 fatty acid weight ratio outside from the range ratio according to the invention, was prepared by enzymatic hydrolysis, this fat/animal digest composition having a C12:0/C10:0 fatty acid weight ratio of 0 and a C14:0/C12:0 fatty acid weight ratio of 9.0.

A nutritionally wet food composition suitable for consumption by cats in the form of loaf was prepared.

Loaf Experimental 1:

Poultry and pork tissues 48.0%; Texturing agents 0.98%; Wheat flour 5.00%; Vitamins and minerals 0.30%; Water—42.72%; fat/animal digest composition "PE 52" 3.00%. The final product was packaged in 400 g metal cans and retorted at 127° C. for 65 min, and has a final moisture level of 80%+−2%.

Loaf Experimental 2:

Poultry and pork tissues 48.0%; Texturing agents 0.98%; Wheat flour 5.00%; Vitamins and minerals 0.30%; Water—42.72%; fat/animal digest composition "PE 62" 3.00%. The final product was packaged in 400 g metal cans and retorted at 127° C. for 65 min, and has a final moisture level of 80%+−2%. Cat palatability tests were performed 1 month after manufacturing.

As shown in Table 20 below, consumption was significantly different between Loaf experimental 1 and Loaf experimental 2, demonstrating the higher palatability for cat of the experimental loaf 1 containing the fat/animal digest composition "PE 52".

This demonstrated that fat/animal digest compositions having a C12:0/C10:0 and/or a C14:0/C12:0 fatty acid weight ratio outside from the range ratio according to the invention did not allow an enhanced palatability, contrary to fat/animal digest composition according to the invention.

TABLE 20

Storage of wet cat food, comparison of loaf having a C12:0/C10:0 and/or C14:0/C12:0 fatty acid weight ratio according to the invention to loaf having a C12:0/C10:0 and/or C14:0/C12:0 fatty acid weight ratio outside from the range according to the invention

| Storage duration (months) | Test day | Food A | Food B | Consumption ratio % A | % B | Statistical significance | Number of validated animals |
|---|---|---|---|---|---|---|---|
| 1 month | Day 1 | Loaf experimental 1 | Loaf experimental 2 | 66 | 34 | *** | 27 |
|  | Day 2 |  |  | 73 | 27 | *** | 27 |

REFERENCES

Brady et al. JAOCS 65:917-921 (1988)

The invention claimed is:

1. A method for preparing a pet food having a property of an enhanced palatability sustained over at least 8 months of storage in an appropriate container at ambient temperature, comprising:
   i) providing at least one fat having a C12:0/C10:0 fatty acid weight ratio from 0.85 to 2.5 and/or a C14:0/C12:0 fatty acid weight ratio from 0.55 to 4.3;
   ii) providing a pet food preparation;
   iii) adding said fat to said pet food preparation by coating; and
   iv) obtaining said pet food.

2. The method according to claim 1, wherein said pet food has a property of an enhanced palatability sustained over at least 15 months of storage in an appropriate container at ambient temperature.

3. The method according to claim 1, wherein step i) comprises providing at least one fat having a C12:0/C10:0 fatty acid weight ratio from 0.85 to 2.5 and a C14:0/C12:0 fatty acid weight ratio from 0.55 to 4.3.

* * * * *